(12) United States Patent
Priev

(10) Patent No.: US 10,882,575 B2
(45) Date of Patent: Jan. 5, 2021

(54) VEHICLES FOR VARIABLY SIZED TRANSPORTATION

(71) Applicant: Intel Corporation, Santa Clara, CA (US)

(72) Inventor: Avi Priev, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 15/799,656

(22) Filed: Oct. 31, 2017

(65) Prior Publication Data

US 2019/0126999 A1    May 2, 2019

(51) Int. Cl.
| | | |
|---|---|---|
| *B62D 63/02* | (2006.01) | |
| *B62D 63/04* | (2006.01) | |
| *B60K 5/10* | (2006.01) | |
| *B62D 39/00* | (2006.01) | |

(52) U.S. Cl.
CPC .............. *B62D 63/025* (2013.01); *B60K 5/10* (2013.01); *B62D 39/00* (2013.01); *B62D 63/02* (2013.01); *B62D 63/04* (2013.01); *B60Y 2200/43* (2013.01)

(58) Field of Classification Search
CPC ...... B62D 63/025; B62D 63/02; B62D 39/00; B62D 63/04; B62D 33/0273; B62D 47/003; B60K 5/10; B60Y 2200/43; G05D 1/0088; G05D 2201/0213; G05D 1/0287; G05D 1/021; G05D 2201/0201; G05D 2201/0212; B60W 2300/15; B60W 2300/17; B60W 2300/34; G01C 21/26; G01C 21/3407; B60N 2/24; B60R 5/041
See application file for complete search history.

(56) References Cited

U.S. PATENT DOCUMENTS

| | | | | |
|---|---|---|---|---|
| 4,350,359 A | * | 9/1982 | Van Gompel | B62K 27/00 280/203 |
| 2008/0217945 A1 | * | 9/2008 | Barnes | B62D 33/08 296/26.13 |

(Continued)

OTHER PUBLICATIONS

Lance Ulanoff, "A car sideway driving-tiny city car" May 8, 2015, 7 pages, retrieved on Feb. 19, 2018 from: https://mashable.com/2015/05/08/eo2-flexible-carfi/#sVvtvoamtaqq.

(Continued)

*Primary Examiner* — Tuan C To
*Assistant Examiner* — Paul A Castro
(74) *Attorney, Agent, or Firm* — Schwabe, Williamson & Wyatt, P.C.

(57) ABSTRACT

A vehicle for variably sized transportation may include a vehicle basis and exterior elements coupled to the vehicle basis. At least some exterior elements may be collapsible or movably coupled to the vehicle basis at a first set of positions or a first set of extended or collapsed states to form a first operational configuration, or at a second set of positions or a second set of extended or collapsed states to form a second operational configuration. The first or second operational configuration may provide for a first or second shadow and a first or second passenger or cargo space for the vehicle. The first and second shadows and the first and second passenger or cargo spaces may differ in at least their longitudinal dimensions or in latitudinal dimensions. Other embodiments may also be described and claimed.

24 Claims, 13 Drawing Sheets

(56) References Cited

U.S. PATENT DOCUMENTS

2008/0231067 A1* 9/2008 Nagle .................. B60P 3/07
                                                    296/50
2011/0156419 A1* 6/2011 Takano ................ B60N 2/24
                                                    296/26.01
2013/0241236 A1* 9/2013 Vitale ................. B62D 21/14
                                                    296/193.04
2019/0381914 A1* 12/2019 Kaneko ................ A47C 3/02

OTHER PUBLICATIONS

"Shrink Your Car to Fit in Small Parking Spaces", Oct. 16, 2013, 1 page, Wall Street Journal, retrieved on Feb. 19, 2018 from: http://www.wsj.com/video/shrink-your-car-to-fit-in-small-parking-spaces/4850C4CD-F88C-494F-AF60-7DE0E3FA419C.html.

* cited by examiner

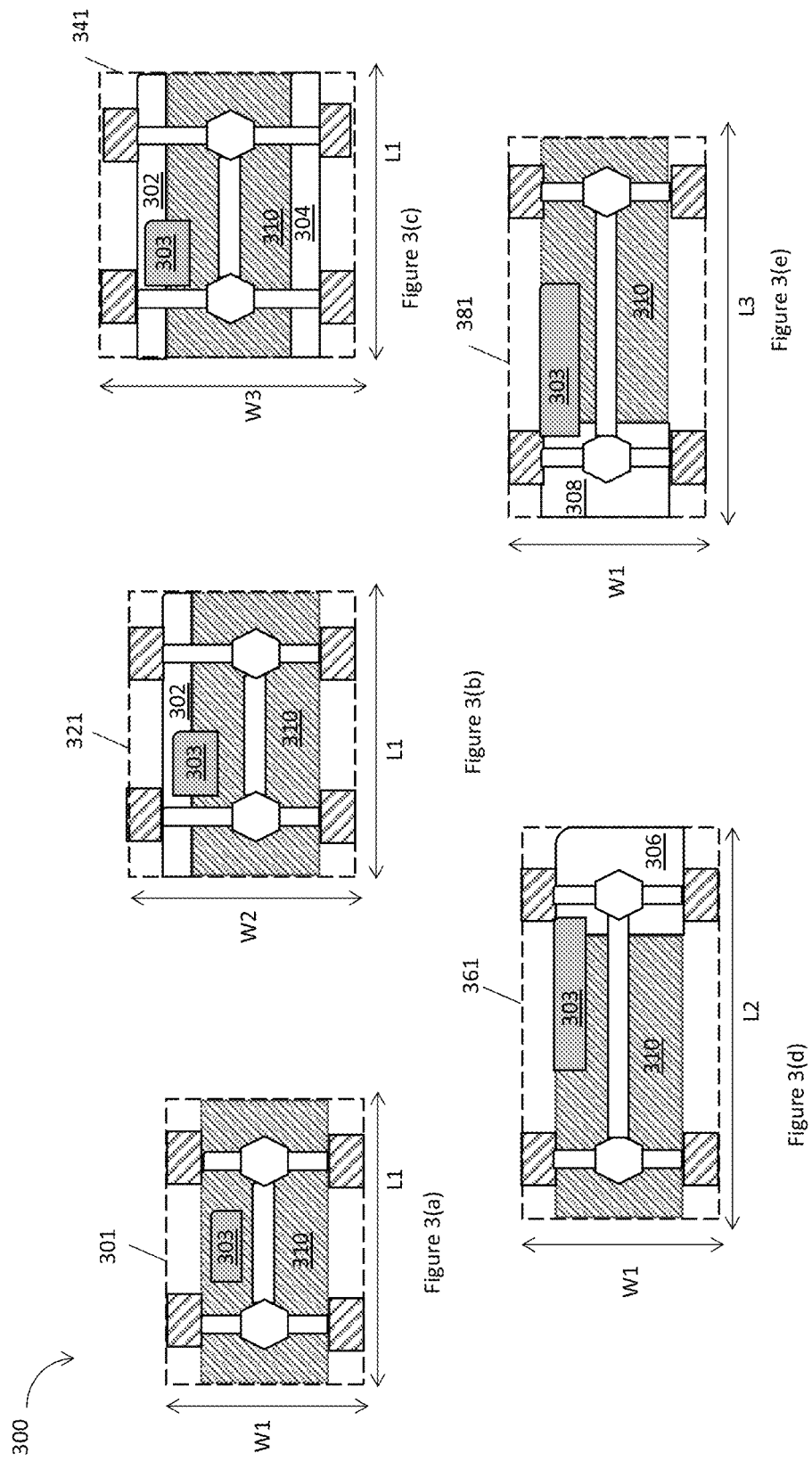

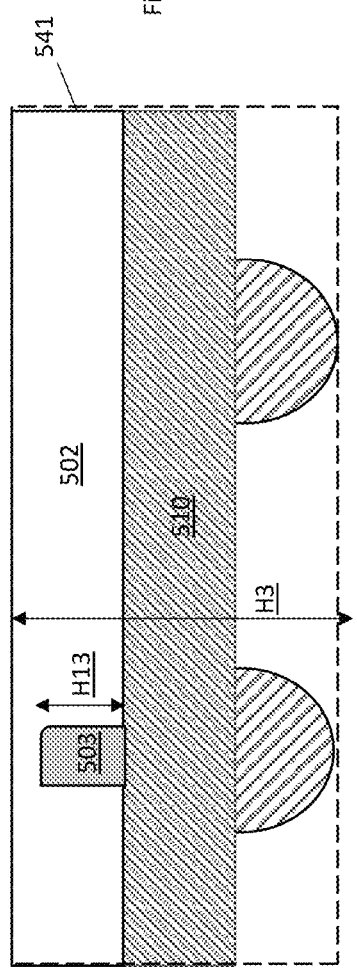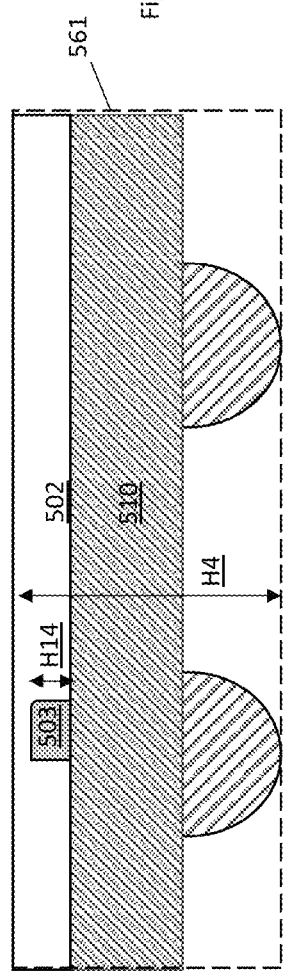

VEHICLES FOR VARIABLY SIZED TRANSPORTATION

FIELD

Embodiments of the present disclosure relate generally to the technical fields of vehicles, and more particularly to computer assisted or autonomous driving vehicles for variably sized transportation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Megapolis roads, streets, and parking space are dramatic overloaded by vehicles in modern urban environment with growing city sizes for increasing populations. Moreover, a large number of cars may be added on the roads and streets every year. Various measures have been taken to address the traffic and parking overload. For example, some European cities, e.g., Rome and London, have already started to restrict access to the city centers by private cars. The problem of roads and streets overcrowded by vehicles may not be able to be solved by conventional linear approach with more roads and parking lots to accommodate more cars. Some solutions may increase a "functional to useful space efficiency ratio" of moving vehicles. For example, more buses may be used to transport more people instead of using taxi or private cars to transport one person or two people. Little has been done related to adjusting the sizes of operating vehicles, when there are excess passenger or cargo spaces, to accommodate more moving traffic on the roads and streets. In addition, previous solutions may be limited by the fact that certain amount of space may be needed to accommodate a human driver.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 3(a)-3(e) illustrate example diagrams of a vehicle for variably sized transportation, where the vehicle may include exterior elements and interior elements collapsible or movably coupled to a vehicle basis to be in different operational configurations, in accordance with various embodiments.

FIGS. 5(a)-5(d) illustrate example diagrams of a vehicle for variably sized transportation, where the vehicle may include exterior elements and interior elements collapsible or movably coupled to a vehicle basis to be in different operational configurations, in accordance with various embodiments.

DETAILED DESCRIPTION

Figure 1:
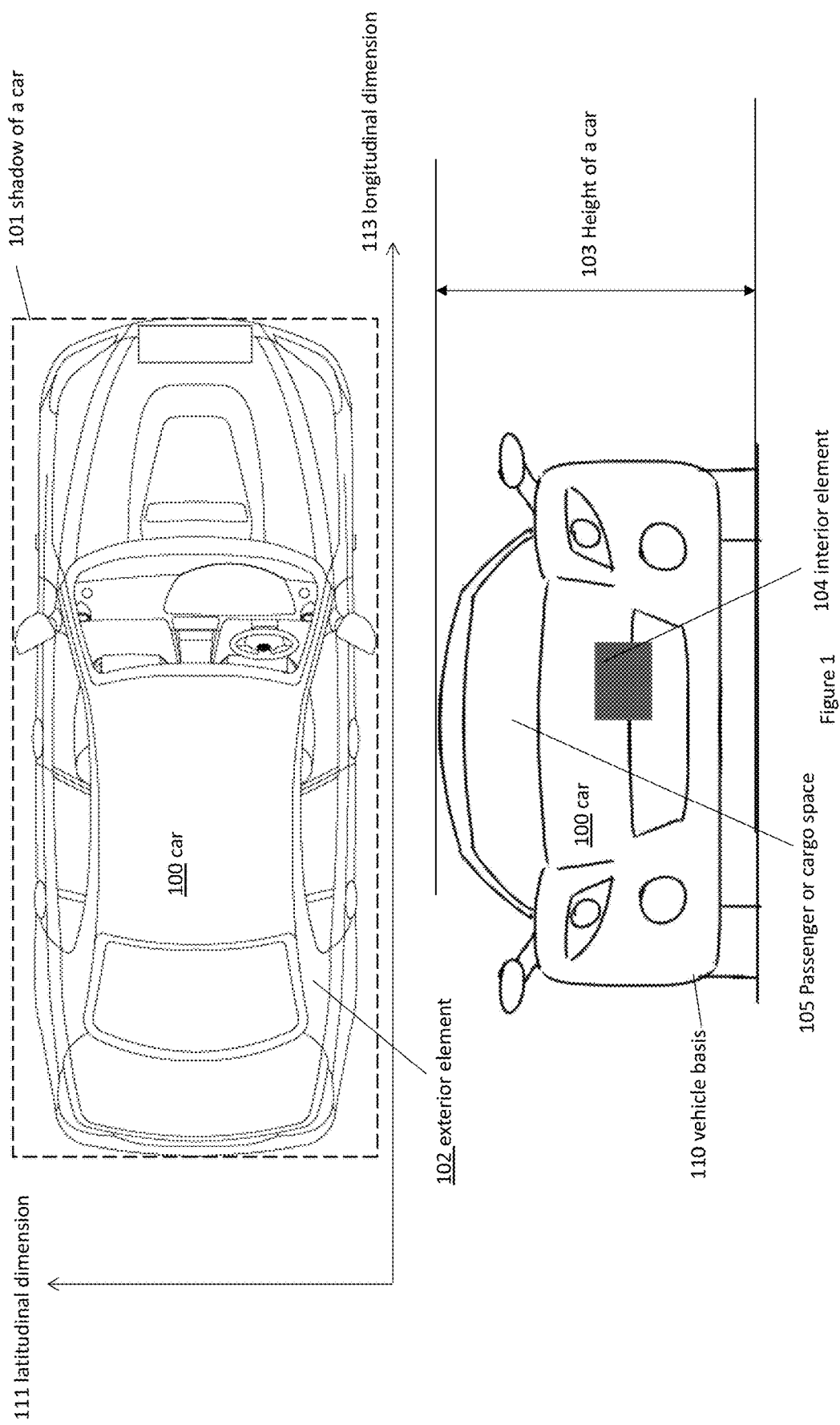
FIG. 1 illustrates an example vehicle for variably sized transportation in top down view and in front view, where the vehicle may include exterior elements and interior elements collapsible or movably coupled to a vehicle basis to be in a selected operational configuration having a shadow and a height, in accordance with various embodiments.

Megapolis roads, streets, and parking space may be overloaded by cars and vehicles in modern urban environment. Previous solutions may provide only minor size adjustments for vehicles not in operation, e.g., collapsible side mirrors, to facilitate parking. No vehicle design has offered a flexibility for adjusting a size of a vehicle in accordance with a number of passengers or cargo the vehicle may serve and/or according to road and municipality environments.

Embodiments herein may provide adaptive adjustment of a size and/or shape of a vehicle according to a number of people or cargos the vehicle may serve to provide variably sized transportation on the roads and streets. A vehicle may be adjusted to a larger size and shape to serve more people or cargos. On the other hand, a vehicle may be adjusted to a smaller size and shape to serve few people or cargos. Such a vehicle may be referred to as a vehicle for variably sized transportation. Embodiments may be applicable to computer assisted or autonomous driving vehicles. An autonomous driving vehicle may be operated on the road without a human driver. Hence, a computer assisted or autonomous driving vehicle may be adjusted in large scale in its external dimensions and inner passenger or cargo spaces in accordance with a usage mode while preserving the vehicle primary self-driving transportation function. An autonomous driving vehicle may be reduced to a small size when no passenger and cargo may be within the vehicle.

In embodiments, a vehicle for variably sized transportation may include a vehicle basis and a plurality of exterior elements coupled to the vehicle basis. At least some exterior elements may be collapsible or movably coupled to the vehicle basis to provide the plurality of exterior elements to be coupled to the vehicle basis at a first set of positions or a first set of extended or collapsed states to form a first operational configuration so that the vehicle is drivable. In addition, at least some exterior elements may be collapsible or movably coupled to the vehicle basis at a second set of positions or a second set of extended or collapsed states to form a second operational configuration. The first operational configuration may provide for a first shadow and a first passenger or cargo space for the vehicle, while the second operational configuration may provide for a second shadow and a second passenger or cargo space for the vehicle. The first and second shadows and the first and second passenger or cargo spaces may differ in at least their longitudinal dimensions or in latitudinal dimensions. Furthermore, the vehicle basis may include an adjustment actuator to facilitate positioning of the plurality of exterior elements from the first operational configuration to the second operational configuration.

In embodiments, a method for a vehicle for variably sized transportation may be applicable to a vehicle including a vehicle basis and a plurality of exterior elements coupled to the vehicle basis. At least some exterior elements of the plurality of exterior elements may be collapsible or movably coupled to the vehicle basis to provide the plurality of exterior elements to be coupled to the vehicle basis at a first set of positions or a first set of extended or collapsed states to form the first operational configuration. Alternatively, at least some exterior elements of the plurality of exterior elements may be collapsible or movably coupled to the vehicle basis to provide the plurality of exterior elements to be coupled to the vehicle basis at a second set of positions or a second set of extended or collapsed states to form the second operational configuration. The first operational configuration may provide for a first shadow and a first passenger or cargo space, the second operational configuration may provide for a second shadow and a second passenger or cargo space, and the first and second shadows and the first and second passenger or cargo spaces may differ in at least their longitudinal dimensions or in latitudinal dimensions. The method may include: identifying a transportation task having a source, a destination, a route between the source and the destination, a number of people, or cargo characteristics including size, shape, or weight; gathering external environment and route information including route width, height, or traffic condition for the transportation task; and determining to adjust the plurality of exterior elements from a first operational configuration to a second operational configuration.

In embodiments, a vehicle for variably sized transportation may include a vehicle basis, a plurality of exterior elements collapsible or movably coupled to the vehicle basis, and a plurality of interior elements collapsible or movably coupled to the vehicle basis. At least some exterior elements may be collapsible or movably coupled to the vehicle basis to provide the plurality of exterior elements to be coupled to the vehicle basis at a first set of positions or a first set of extended or collapsed states to form a first operational configuration, or coupled to the vehicle basis at a second set of positions or a second set of extended or collapsed states to form a second operational configuration. The first operational configuration may provide for a first shadow and a first passenger or cargo space, while the second operational configuration may provide for a second shadow and a second passenger or cargo space, where the first and second shadows and the first and second passenger or cargo spaces may differ in at least their longitudinal dimensions or in latitudinal dimension. Similarly, the plurality of interior elements may be coupled to the vehicle basis at a first set of internal positions or a first set of extended or collapsed internal states to form a first internal operational configuration, or coupled to the vehicle basis at a second set of internal positions or a second set of extended or collapsed internal states to form a second internal operational configuration different from the first internal operational configuration. The vehicle basis may include an adjustment actuator to facilitate positioning of the plurality of exterior elements from the first operational configuration to the second operational configuration, or positioning of the plurality of interior elements from the first internal operational configuration to the second internal operational configuration.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device or any complex system capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link,"

"carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Figure 12:
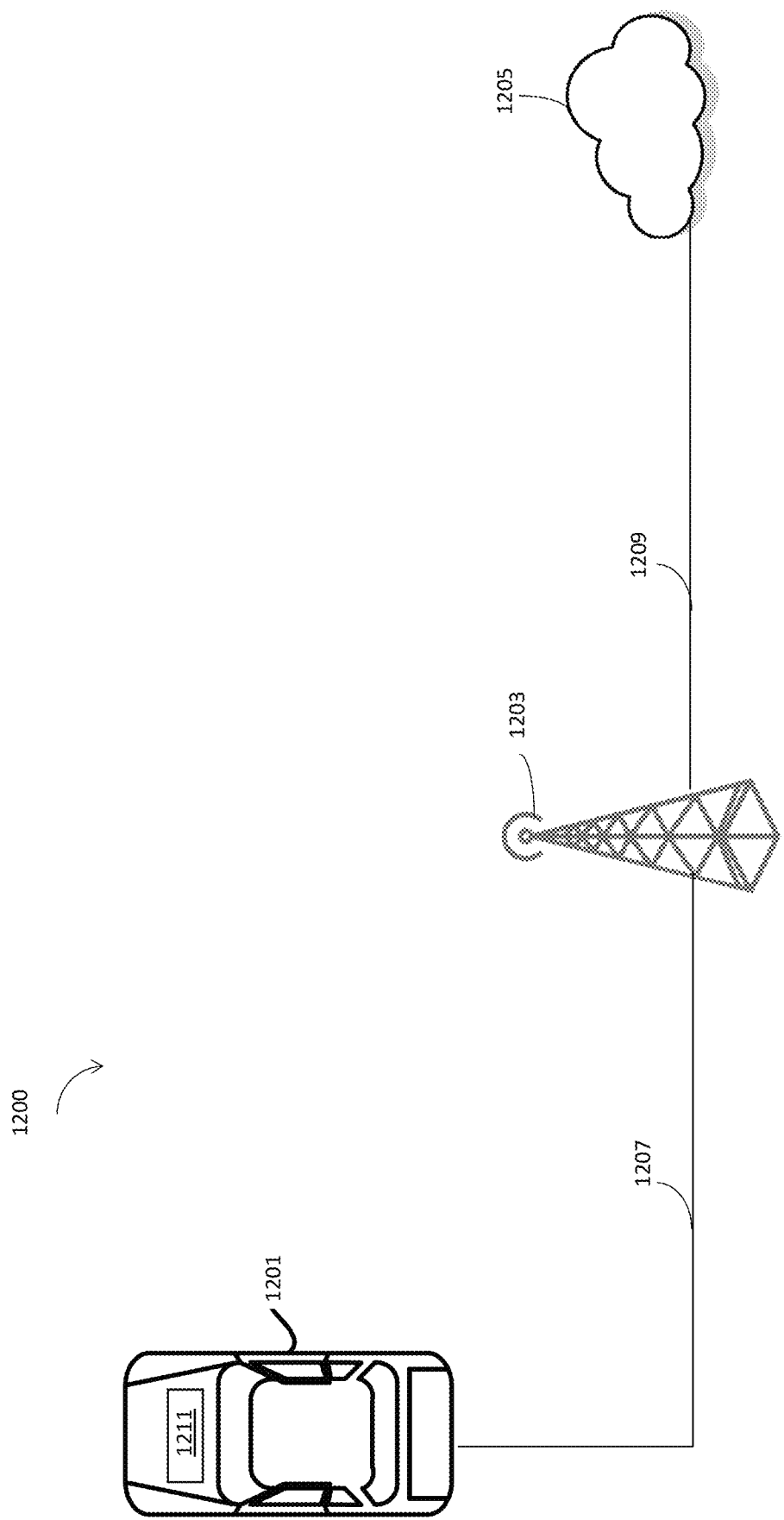
FIG. 12 illustrates an environment in which various embodiments described with references to FIGS. 1-11 may be practiced.

FIG. 1 illustrates an example vehicle 100 for variably sized transportation in top down view and in front view, where the vehicle 100 may include exterior elements, e.g., an exterior element 102, and interior elements, e.g., an interior element 104, collapsible or movably coupled to a vehicle basis, e.g., a vehicle basis 110, to be in an operational configuration having a shadow and a height, in accordance with various embodiments. For clarity, features of the vehicle 100, the exterior element 102, the interior element 104, and the vehicle basis 110 may be described below as an example for understanding a vehicle, exterior elements, interior elements, and a vehicle basis. It is to be understood that there may be more or fewer components included in the vehicle 100, the exterior element 102, the interior element 104, and the vehicle basis 110. Further, it is to be understood that one or more of the devices and components within the vehicle 100, the exterior element 102, the interior element 104, and the vehicle basis 110 may include additional and/or varying features from the description below, and may include any devices and components that one having ordinary skill in the art would consider and/or refer to as a vehicle, exterior elements, interior elements, and a vehicle basis. The vehicle 100 may be a computer assisted or autonomous driving vehicle, e.g., a computer assisted or autonomous driving vehicle 1201 as shown in FIG. 12. In some other embodiments, the vehicle 100 may not be a computer assisted or autonomous driving vehicle. In embodiments, vehicles 100 may be an electric vehicle or a combustion engine vehicle.

In embodiments, the vehicle 100 for variably sized transportation may include the exterior element 102, the interior element 104, coupled to the vehicle basis 110. The exterior element 102 and the interior element 104 may be coupled to the vehicle basis 110 to form a selected operational configuration from a plurality of operational configurations. The vehicle 100 may be drivable at each operational configuration. Each operational configuration may provide for a particular shadow 101, a particular height 103, and a particular passenger or cargo space 105. A particular shadow 101 may have a particular longitudinal dimension 113 and a particular latitudinal dimension 111. The vehicle 100 in different operational configurations may have shadows with different longitudinal dimensions and latitudinal dimensions.

The vehicle 100 may be of various shapes, such as a circular shape, an elliptical shape, a rectangle shape, a polygon shape, and so forth. The shadow 101, may also be referred to as a footprint, may be a rectangle shape covering the span of the vehicle 100 in longitudinal and latitudinal directions on a road surface. The shadow 101 may represent an area of a surface that encloses the vehicle 100. The shadow 101 and the height 103 may represent an exterior volume of the vehicle 101, which may further represent a surface area of a road, or a space the vehicle 100 may occupy during operation. On the other hand, the passenger or cargo space 105 may represent an interior volume that can be useful to transport human and/or cargo.

In embodiments, the exterior element 102 may be selected from one or more of a part of a frame or a body of the vehicle, a wheel, a mirror, a door, a rim, a valance, a fender, or other exterior elements. The exterior element 102 may be shown as one piece, but it may represent a plurality of exterior elements. The exterior element 102 may be of a circular shape, an elliptical shape, a rectangle shape, or a polygon shape. In embodiments, the interior element 104 may include one or more of an engine, a fuel system, an electrical system, a cooling and lubrication system, an exhaust and emission control system, a drive train system, a suspension, a steering wheel, a brake system, an accessory and safety system, or other interior elements. For example, the interior element 104 may include an engine with a telescopic movable pipe.

The exterior element 102 may be collapsible or movably coupled to the vehicle basis 110. For example, the exterior element 102 may be moved to attach at different positions of the vehicle basis 110. The exterior element 102 may be attached to a fix position of the vehicle basis 110, but the exterior element 102 may be extended or collapsed in different states without changing the attachment position. In embodiments, the exterior element 102 and/or a plurality of other exterior elements may be coupled to the vehicle basis 110 at a first set of positions or a first set of extended or collapsed states to form a first operational configuration. Alternatively, the exterior element 102 and/or a plurality of other exterior elements may be coupled to the vehicle basis 110 at a second set of positions or a second set of extended or collapsed states to form a second operational configuration. The first operational configuration may provide for a first shadow and a first passenger or cargo space, and the second operational configuration provides for a second shadow and a second passenger or cargo space. The first and second shadows and the first and second passenger or cargo spaces may differ in at least their longitudinal dimensions or in latitudinal dimensions. In some embodiments, the first operational configuration and the second first operational configuration, or the first and second passenger or cargo spaces further differ in their heights.

In embodiments, the interior element 104 and/or a plurality of interior elements may be collapsible or movably coupled to the vehicle basis. For example, the interior element 104 may be moved to attach at different internal positions of the vehicle basis 110. Alternatively, the interior element 104 may be attached to a fix internal position of the vehicle basis 110, but the interior element 104 may be extended or collapsed in different internal states without changing the attachment position. The plurality of interior elements including the interior element 104 may be coupled to the vehicle basis at a first set of internal positions or a first set of extended or collapsed internal states to form a first internal operational configuration, or coupled to the vehicle basis at a second set of internal positions or a second set of extended or collapsed internal states to form a second internal operational configuration.

Figure 2:
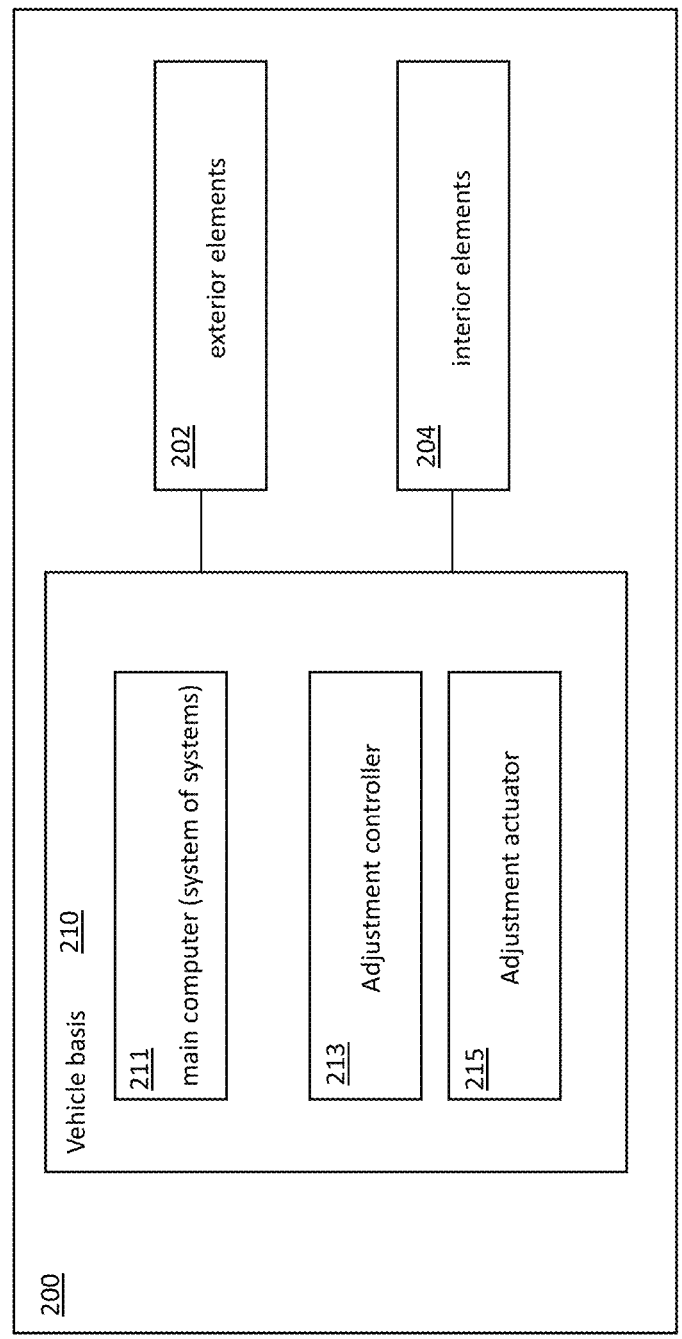
FIG. 2 illustrates an example block diagram of a vehicle for variably sized transportation, where the vehicle may include exterior elements and interior elements collapsible or movably coupled to a vehicle basis to be in a selected operational configuration, in accordance with various embodiments.

FIG. 2 illustrates an example block diagram of a vehicle 200 for variably sized transportation, where the vehicle may include exterior elements 202 and interior elements 204 collapsible or movably coupled to a vehicle basis 210 to be in an operational configuration, in accordance with various embodiments. In embodiments, the vehicle 200, the exterior elements 202, the interior elements 204, and the vehicle basis 210 may be similar to the vehicle 100, the exterior element 102, the interior element 104, and the vehicle basis 110 as shown in FIG. 1.

In embodiments, the vehicle 200 for variably sized transportation may include the exterior elements 202, the interior elements 204, collapsible or movably coupled to the vehicle basis 210. The vehicle basis 210 may include an adjustment actuator 215, an adjustment controller 213, and a main computer 211 that may be for system of systems. The exterior elements 202 or the interior elements 204 may be collapsible or movably coupled to the vehicle basis 210 to form different operational configurations.

In embodiments, at least some exterior elements of the exterior elements 202 may be collapsible or movably coupled to the vehicle basis 210 to provide the exterior elements 202 to be coupled to the vehicle basis 210 at a first set of positions or a first set of extended or collapsed states to form a first operational configuration, or coupled to the vehicle basis at a second set of positions or a second set of extended or collapsed states to form a second operational configuration; The first operational configuration may provide for a first shadow and a first passenger or cargo space, and the second operational configuration provides for a second shadow and a second passenger or cargo space. The first and second shadows and the first and second passenger or cargo spaces may differ in at least their longitudinal dimensions or in latitudinal dimensions. In addition, the first operational configuration and the second first operational configuration, or the first and second passenger or cargo spaces further differ in their heights.

In embodiments, the vehicle basis 210 may include components or parts of the vehicle 200 shared between the first operational configuration and the second operational configuration. For example, the vehicle basis 210 may include the main computer 211 and/or the adjustment controller 213, which may be coupled to the adjustment actuator 215 to determine to move at least some of the exterior elements 202, or to collapse or extend at least some of the exterior elements 202 to change the vehicle from the first operational configuration to the second operational configuration. In addition, the adjustment actuator 215 may facilitate positioning of the plurality of exterior elements 202 from a first operational configuration to a second operational configuration.

In embodiments, the main computer 211 and/or the adjustment controller 213 may include one or more central processing unit (CPUs). In some embodiments, the main computer 211 and/or the adjustment controller 213, in addition to the one or more CPUs, may include a programmable device (such as a hardware accelerator or a FPGA). In embodiments, the main computer 211 and/or the adjustment controller 213 may be a microcontroller, a 16-bit processor, a 32-bit processor, a 64-bit processor, a single core processor, a multi-core processor, a digital signal processor, an embedded processor, or any other processor.

FIGS. 3(a)-3(e) illustrate example diagrams of a vehicle 300 for variably sized transportation, where the vehicle 300 may include exterior elements, e.g., an exterior element 302, an exterior element 304, an exterior element 306, and an exterior element 308, and interior elements, e.g., an interior element 303, collapsible or movably coupled to a vehicle basis 310 to be in different operational configurations, in accordance with various embodiments. In embodiments, the vehicle 300, the exterior element 302, the exterior element 304, the exterior element 306, the exterior element 308, the interior element 303, and the vehicle basis 310 may be similar to the vehicle 100, the exterior element 102, the interior element 104, and the vehicle basis 110 respectively, as shown in FIG. 1. Similarly, the vehicle 300, the exterior element 302, the exterior element 304, the exterior element 306, the exterior element 308, the interior element 303, and the vehicle basis 310 may be similar to the vehicle 200, exterior elements 202, interior elements 204, and the vehicle basis 210 respectively, as shown in FIG. 2.

In embodiments, as shown in FIG. 3(a), the vehicle 300 may be in an operational configuration 301, where no exterior element is in an expanded position. Instead, the exterior elements may be in collapsed states. The vehicle 300 may include the interior element 303 collapsible or movably coupled to the vehicle basis 310. The shadow of the vehicle 300 in the operational configuration 301 may be a rectangle shape with a length L1 relative to a surface of a road in the traveling direction and a width W1 relative to the surface of the road orthogonal to the traveling direction. Since no exterior element of the vehicle 300 may be in an expanded position, the operational configuration 301 may have the smallest shadow size among the shadows of the vehicle 300 in various operational configurations, e.g., the operational configuration 321, the operational configuration 341, the operational configuration 361, and the operational configuration 381. In some embodiments, the operational configuration 301 may be for no human or no cargo within the vehicle 300, where the vehicle 300 may be a computer assisted or autonomous driving vehicle operated on the road without a human driver. As such, the vehicle 300 in the operational configuration 301 may have a shadow with a smaller size than a shadow size of a human operated vehicle, since a human operated vehicle may have a passenger space for a human driver.

In embodiments, as shown in FIG. 3(b), the vehicle 300 may be in an operational configuration 321, where the exterior element 302 may be in an expanded position. The vehicle 300 may further include the interior element 303 collapsible or movably coupled to the vehicle basis 310. The shadow of the vehicle 300 in the configuration 321 may be a rectangle shape with the length L1 relative to a surface of a road in the traveling direction and a width W2 relative to the surface of the road orthogonal to the traveling direction. In embodiments, the width W2 may be larger than the width W1.

In embodiments, as shown in FIG. 3(c), the vehicle 300 may be in an operational configuration 341, where the exterior element 302 and the exterior 304 may both be in expanded positions. The vehicle 300 may include the interior element 303 collapsible or movably coupled to the vehicle basis 310. The shadow of the vehicle 300 in the configuration 341 may be a rectangle shape with the length L1 relative to a surface of a road in the traveling direction and a width W3 relative to the surface of the road orthogonal to the traveling direction. In embodiments, the width W3 may be larger than the width W2.

In embodiments, as shown in FIG. 3(d), the vehicle 300 may be in an operational configuration 361, where the exterior element 306 may be in an expanded position. The vehicle 300 may include the interior element 303 collapsible or movably coupled to the vehicle basis 310. The shadow of the vehicle 300 in the configuration 361 may be a rectangle shape with a length L2 relative to a surface of a road in the traveling direction and the width W1 relative to the surface of the road orthogonal to the traveling direction. In embodiments, the length L2 may be larger than the length L1.

In embodiments, as shown in FIG. 3(e), the vehicle 300 may be in an operational configuration 381, where the exterior element 308 may be in an expanded position. The vehicle 300 may include the interior element 303 collapsible or movably coupled to the vehicle basis 310. The shadow of the vehicle 300 in the configuration 381 may be a rectangle shape with a length L3 relative to a surface of a road in the traveling direction and the width W1 relative to the surface of the road orthogonal to the traveling direction. In embodiments, the length L3 may be larger than the length L1.

In embodiments, the vehicle basis 310 may include components and parts used in all the operational configurations, e.g., the operational configuration 301, the operational configuration 321, the operational configuration 341, the operational configuration 361, and the operational configuration 381. On the other hand, various exterior elements may be attached to the vehicle basis 310 at the longitudinal dimension, e.g., the exterior element 306, and the exterior element 308, or at the latitudinal dimension, e.g., the exterior element 302, and the exterior element 304. In some embodiments, there may be multiple exterior elements attached to the vehicle basis 310 and in expanded positions at the same time. For example, the exterior element 302, the exterior element 304, the exterior element 306, and the exterior element 308, may be in expanded positions at the same time, not shown.

Figure 4B:
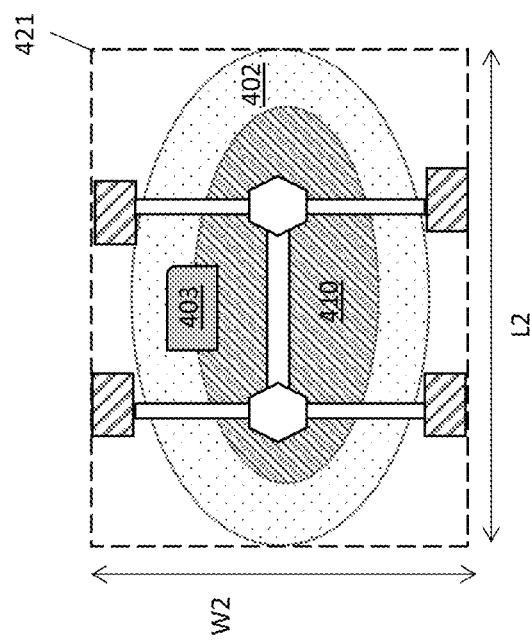
FIGS. 4(a)-4(b) illustrate example diagrams of a vehicle for variably sized transportation, where the vehicle may include exterior elements and interior elements collapsible or movably coupled to a vehicle basis to be in different operational configurations, in accordance with various embodiments.
Figure 4A:
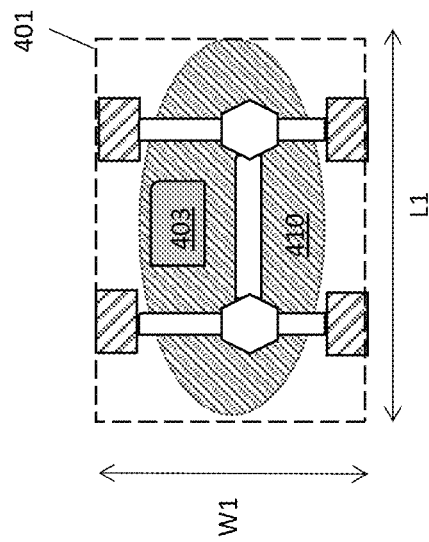

FIGS. 4(*a*)-4(*b*) illustrate example diagrams of a vehicle 400 for variably sized transportation, where the vehicle 400 may include exterior elements, e.g., an exterior element 402, and interior elements, e.g., an interior element 403, collapsible or movably coupled to a vehicle basis 410 to be in different operational configurations, in accordance with various embodiments. In embodiments, the vehicle 400, the exterior element 402, the interior element 403, and the vehicle basis 410 may be similar to the vehicle 100, the exterior element 102, the interior element 104, and the vehicle basis 110 respectively, as shown in FIG. 1. Similarly, the vehicle 400, the exterior element 402, the interior element 403, and the vehicle basis 410 may be similar to the vehicle 200, exterior elements 202, interior elements 204, and the vehicle basis 210 respectively, as shown in FIG. 2.

In embodiments, as shown in FIG. 4(*a*), the vehicle 400 may be in an operational configuration 401, where no exterior element is in an expanded position. The shadow of the vehicle 400 in the configuration 401 may be a rectangle shape with a length L1 relative to a surface of a road in the traveling direction and a width W1 relative to the surface of the road orthogonal to the traveling direction. The vehicle basis 410 may be of a circular shape or an elliptical shape. The vehicle basis 410 may be for example only. In some other embodiments, the vehicle basis 410 may be of a polygon shape.

In embodiments, as shown in FIG. 4(*b*), the vehicle 400 may be in an operational configuration 421, where the exterior element 402 may be in an expanded position. The exterior element 402 may also be of a circular shape or an elliptical shape and may be expanded around the edge of the vehicle basis 410. The shadow of the vehicle 400 in the configuration 421 may be a rectangle shape with a length L2 relative to a surface of a road in the traveling direction and a width W2 relative to the surface of the road orthogonal to the traveling direction. The length L2 may be larger than the length L1, while the width W2 may be larger than the width W1.

Figure 5A:
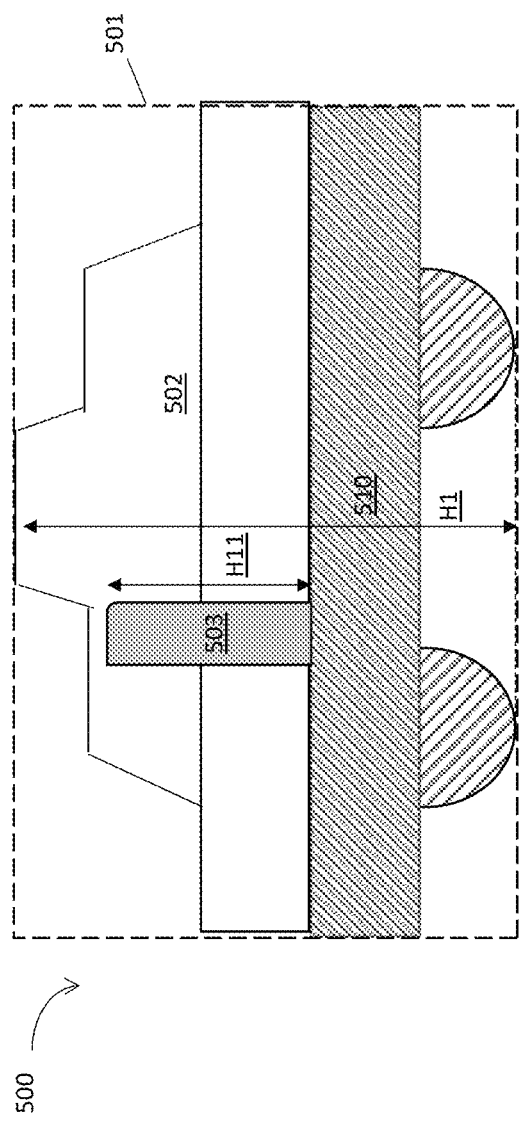
Figure 5B:
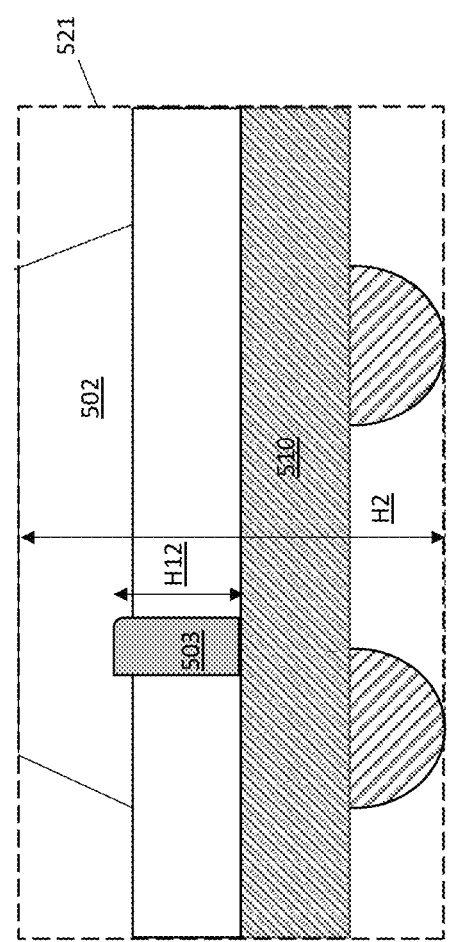

FIGS. 5(*a*)-5(*d*) illustrate example diagrams of a vehicle 500 for variably sized transportation, where the vehicle 500 may include exterior elements, e.g., an exterior element 502, and interior elements, e.g., an interior element 503, collapsible or movably coupled to a vehicle basis 510 to be in different operational configurations, in accordance with various embodiments. In embodiments, the vehicle 500, the exterior element 502, the interior element 503, and the vehicle basis 510 may be similar to the vehicle 100, the exterior element 102, the interior element 104, and the vehicle basis 110 respectively, as shown in FIG. 1. Similarly, the vehicle 500, the exterior element 502, the interior element 503, and the vehicle basis 510 may be similar to the vehicle 200, exterior elements 202, interior elements 204, and the vehicle basis 210 respectively, as shown in FIG. 2.

In embodiments, as shown in FIG. 5(*a*), the vehicle 500 may be in an operational configuration 501. The exterior element 502 and the interior element 503 may be in an expanded state to accommodate more people and/or cargos. The vehicle 500 in the operational configuration 501 may have a height H1. The interior element 503 attached to the vehicle basis 510 may have a height H11.

In embodiments, as shown in FIG. 5(*b*), the vehicle 500 may be in an operational configuration 521. The exterior element 502 and the interior element 503 may be in a collapsed state to accommodate fewer people and/or cargos than the operational configuration 501. The vehicle 500 in the operational configuration 521 may have a height H2. The interior element 503 attached to the vehicle basis 510 may have a height H12.

In embodiments, as shown in FIG. 5(*c*), the vehicle 500 may be in an operational configuration 541. The exterior element 502 and the interior element 503 may be in a further collapsed state to accommodate fewer people and/or cargos than the operational configuration 521. The vehicle 500 in the operational configuration 541 may have a height H3. The interior element 503 attached to the vehicle basis 510 may have a height H13.

In embodiments, as shown in FIG. 5(*d*), the vehicle 500 may be in an operational configuration 561. The exterior element 502 and the interior element 503 may be in a further collapsed state to accommodate fewer people and/or cargos than the operational configuration 41. The vehicle 500 in the operational configuration 561 may have a height H4. The interior element 503 attached to the vehicle basis 510 may have a height H14.

In embodiments, the height H1 may be larger than the height H2, the height H2 may be larger than the height H3, and the height H3 may be larger than the height H4. At the meantime, the height of the interior element 503 may become smaller and smaller as a same time as the height of the vehicle in different operational configurations may become smaller. For example, the height H11 may be larger than the height H12, the height H12 may be larger than the height H13, and the height H13 may be larger than the height H14.

Figure 6:
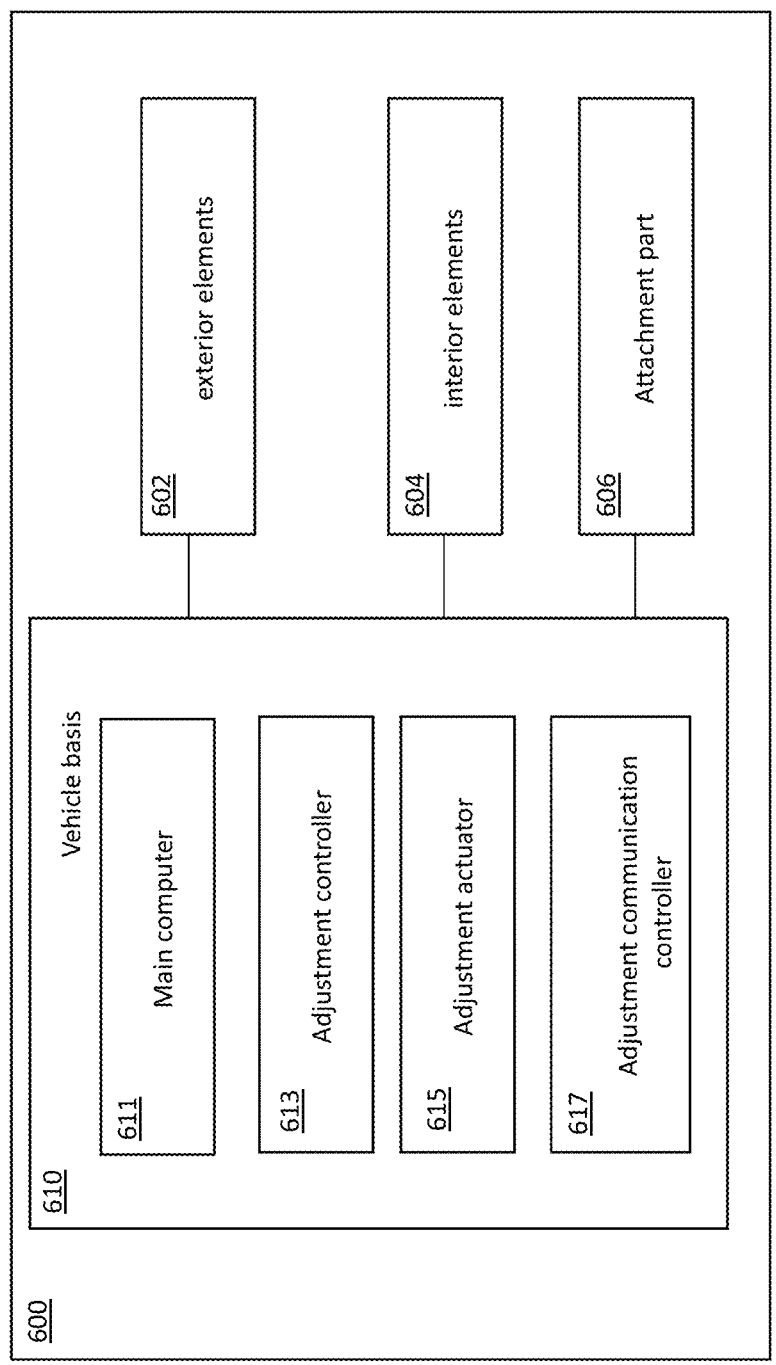
FIG. 6 illustrates an example vehicle for variably sized transportation, where the vehicle may be combined with another vehicle through an attachment part coupled to a vehicle basis, in accordance with various embodiments.

FIG. 6 illustrates an example vehicle 600 for variably sized transportation, where the vehicle 600 may be combined with another vehicle through an attachment part 606 coupled to a vehicle basis 610, in accordance with various embodiments. In embodiments, the vehicle 600 and the vehicle basis 610 may be similar to the vehicle 100 and the vehicle basis 110 respectively, as shown in FIG. 1. Similarly, the vehicle 600 and the vehicle basis 610 may be similar to the vehicle 200 and the vehicle basis 210 respectively, as shown in FIG. 2.

In embodiments, the vehicle 600 for variably sized transportation may include exterior elements 602, interior elements 604, collapsible or movably coupled to the vehicle basis 610. The vehicle basis 610 may include an adjustment actuator 615, an adjustment controller 613, and a main computer 611. The exterior elements 602 or the interior elements 604 may be collapsible or movably coupled to the vehicle basis 610 to form different operational configurations. The exterior elements 602, the interior elements 604, the adjustment actuator 615, the adjustment controller 613, and the main computer 611 may be similar to the exterior elements 202, the interior elements 204, the adjustment actuator 215, the adjustment controller 213, and the main computer 211 respectively, as shown in FIG. 2.

In addition, the vehicle 600 may include an attachment part 606 attached to the vehicle basis 610. The vehicle 600 may be combined with another vehicle through the attachment part 606 to form a combined vehicle. Furthermore, the vehicle basis 610 may include an adjustment communication controller 617 coupled to the adjustment actuator 615, where the adjustment communication controller 617 may communicate with another vehicle to combine the vehicle 600 and another vehicle through the attachment part 606.

Figure 7:
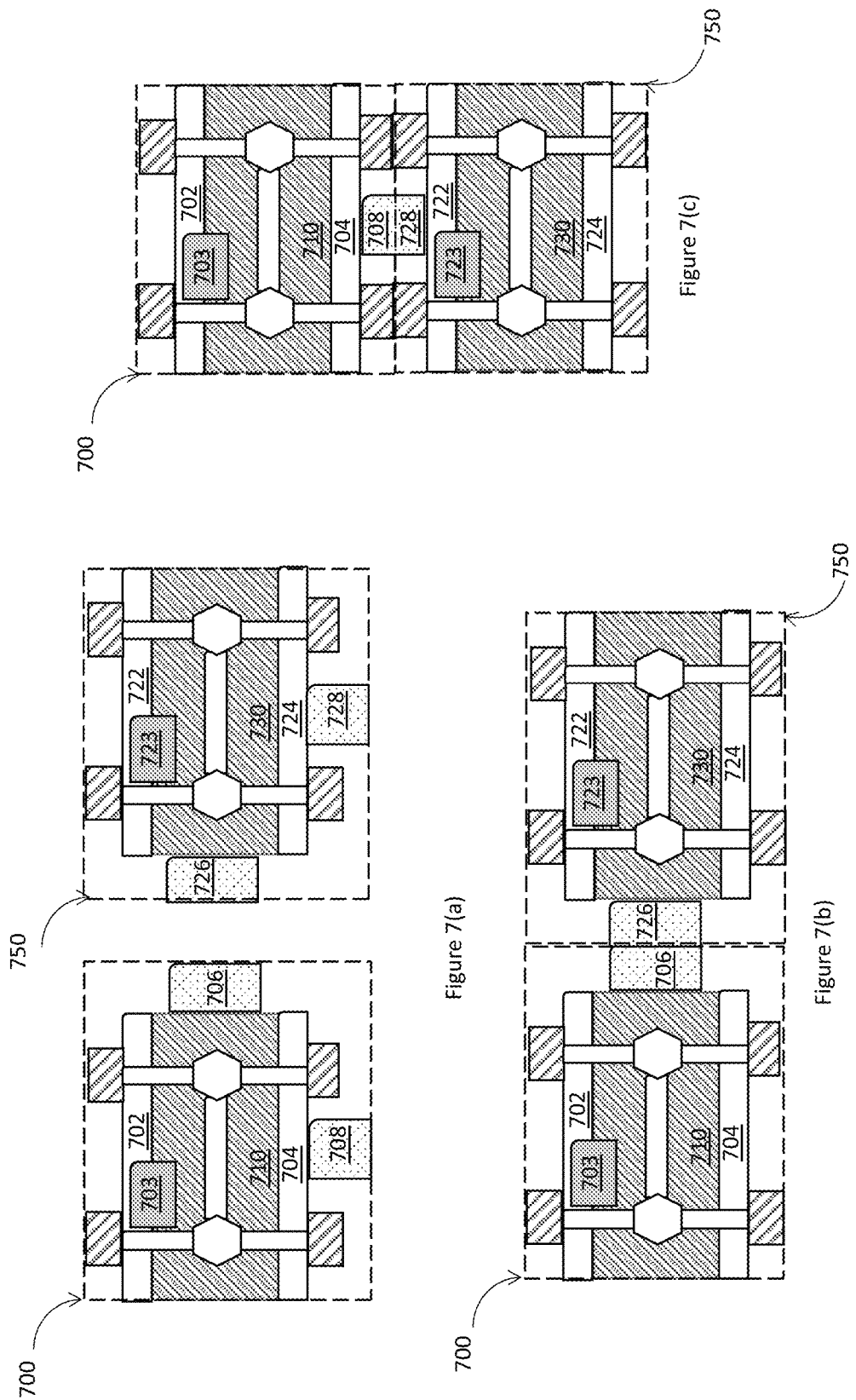
FIGS. 7(a)-7(c) illustrate example vehicles for variably sized transportation, where one vehicle may be combined with another vehicle through attachment parts coupled to vehicle basis, in accordance with various embodiments.

FIGS. 7(a)-7(c) illustrate example vehicles for variably sized transportation, where one vehicle, e.g., vehicle 700, may be combined with another vehicle, e.g., vehicle 750, through attachment parts, e.g., an attachment part 706 or an attachment part 708, coupled to vehicle basis, e.g., a vehicle basis 710, in accordance with various embodiments. In embodiments, the vehicle 700 and the vehicle basis 710 may be similar to the vehicle 100 and the vehicle basis 110 respectively, as shown in FIG. 1. Similarly, the vehicle 700 and the vehicle basis 710 may be similar to the vehicle 200 and the vehicle basis 210 respectively, as shown in FIG. 2.

In embodiments, as shown in FIG. 7(a), the vehicle 700 for variably sized transportation may include an exterior element 702, an exterior element 704, an interior element 703, collapsible or movably coupled to the vehicle basis 710. The exterior element 702, the exterior element 704, the interior element 703 may be collapsible or movably coupled to the vehicle basis 710 to form different operational configurations. The exterior element 702, the exterior element 704, the interior element 703 may be similar to the exterior elements 202 and the interior elements 204 respectively, as shown in FIG. 2.

Another vehicle 750 may include an exterior element 722, an exterior element 724, an interior element 723, collapsible or movably coupled to a vehicle basis 730. The exterior element 722, the exterior element 724, and the interior element 723 may be collapsible or movably coupled to the vehicle basis 730 to form different operational configurations. The exterior element 722, the exterior element 724, and the interior element 723 may be similar to the exterior elements 202 and the interior elements 204 respectively, as shown in FIG. 2.

In addition, the vehicle 700 may include the attachment part 706 coupled to the vehicle basis 710 at one end, and the attachment part 708 attached to the vehicle basis 710 at one side. There may be more attachment parts coupled to the vehicle basis 710 at another end, or both ends. Similarly, there may be more attachment parts coupled to the vehicle basis 710 at another side, or both sides. The vehicle 750 may include an attachment part 726 coupled to the vehicle basis 730 at one end, and an attachment part 728 attached to the vehicle basis 730 at one side. There may be more attachment parts coupled to the vehicle basis 730 at another end, or both ends. Similarly, there may be more attachment parts coupled to the vehicle basis 730 at another side, or both sides.

In embodiments, as shown in FIG. 7(b), the vehicle 700 may be combined with another vehicle 750 through the attachment part 706 and the attachment part 726. The vehicle 700 may be combined with another vehicle 750 in sequence relative to a surface of a road to obtain a combined vehicle, where the combined vehicle has a shadow size that fits into a driving lane of the road.

Additionally and alternatively, in embodiments, as shown in FIG. 7(c), the vehicle 700 may be combined with another vehicle 750 through the attachment part 708 and the attachment part 728. The vehicle 700 may be combined with another vehicle 750 in parallel relative to a surface of a road to obtain a combined vehicle, where the combined vehicle has a shadow size that fits into a driving lane of the road.

Figure 8:
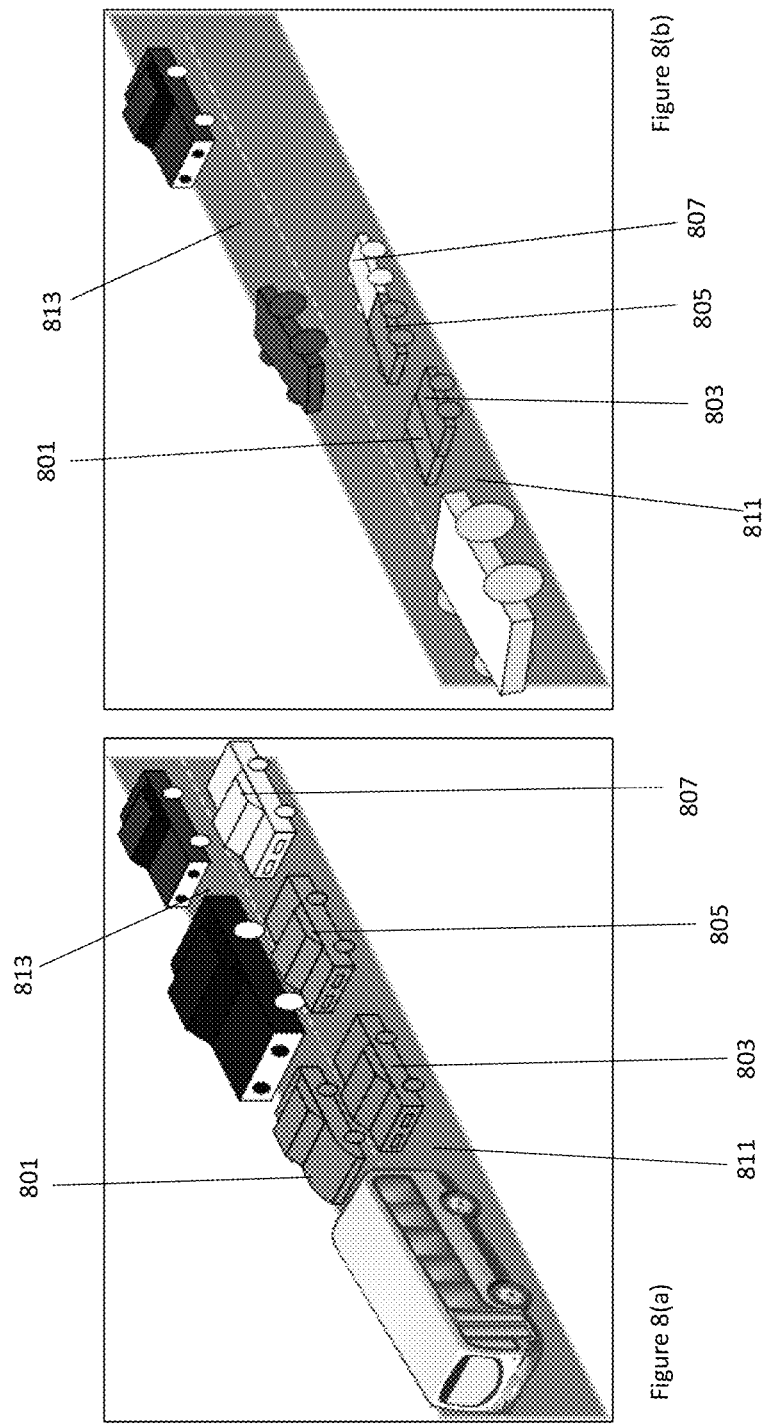
FIGS. 8(a)-8(b) illustrate example vehicles for variably sized transportation, where a first vehicle may be combined with a second vehicle to form a combined vehicle, in accordance with various embodiments.

FIGS. 8(a)-8(b) illustrate example vehicles, e.g., a vehicle 801, a vehicle 803, a vehicle 805, a vehicle 807, for variably sized transportation, where a first vehicle may be combined with a second vehicle to form a combined vehicle, in accordance with various embodiments. In embodiments, the vehicle 801, the vehicle 803, the vehicle 805, and the vehicle 807 may be similar to the vehicle 100 as shown in FIG. 1, the vehicle 200 as shown in FIG. 2, or the vehicle 600 in FIG. 6.

In embodiments, as shown in FIG. 8(a), the vehicle 801 may be operating on a driving lane 813, while the vehicle 803, the vehicle 805, and the vehicle 807 may be operating on a driving lane 811. The vehicle 801, the vehicle 803, the vehicle 805, and the vehicle 807 may include exterior elements and interior elements collapsible or movably coupled to a vehicle basis to be in an operational configuration. For the operational configurations shown in FIG. 8(a), the vehicle 801, the vehicle 803, the vehicle 805, and the vehicle 807 may contain regular number of passengers or cargo so that the vehicle 801, the vehicle 803, the vehicle 805, and the vehicle 807 may be operating on a normal driving lane, e.g., the driving lane 811 or the driving lane 813.

In embodiments, as shown in FIG. 8(b), the vehicle 801 may be combined with the vehicle 803 to operate on the driving lane 811, while the vehicle 805 may be combined with the vehicle 807 to operate on the driving lane 811. The vehicle 801 may be combined with the vehicle 803 in parallel relative to a surface of the driving lane 811 to obtain a combined vehicle, where the combined vehicle has a shadow size that fits into a driving lane 811. On the other hand, the vehicle 805 and the vehicle 807 may be combined in sequence relative to a surface of the driving lane 811 to obtain a combined vehicle, where the combined vehicle has a shadow size that fits into a driving lane 811.

Figure 9:
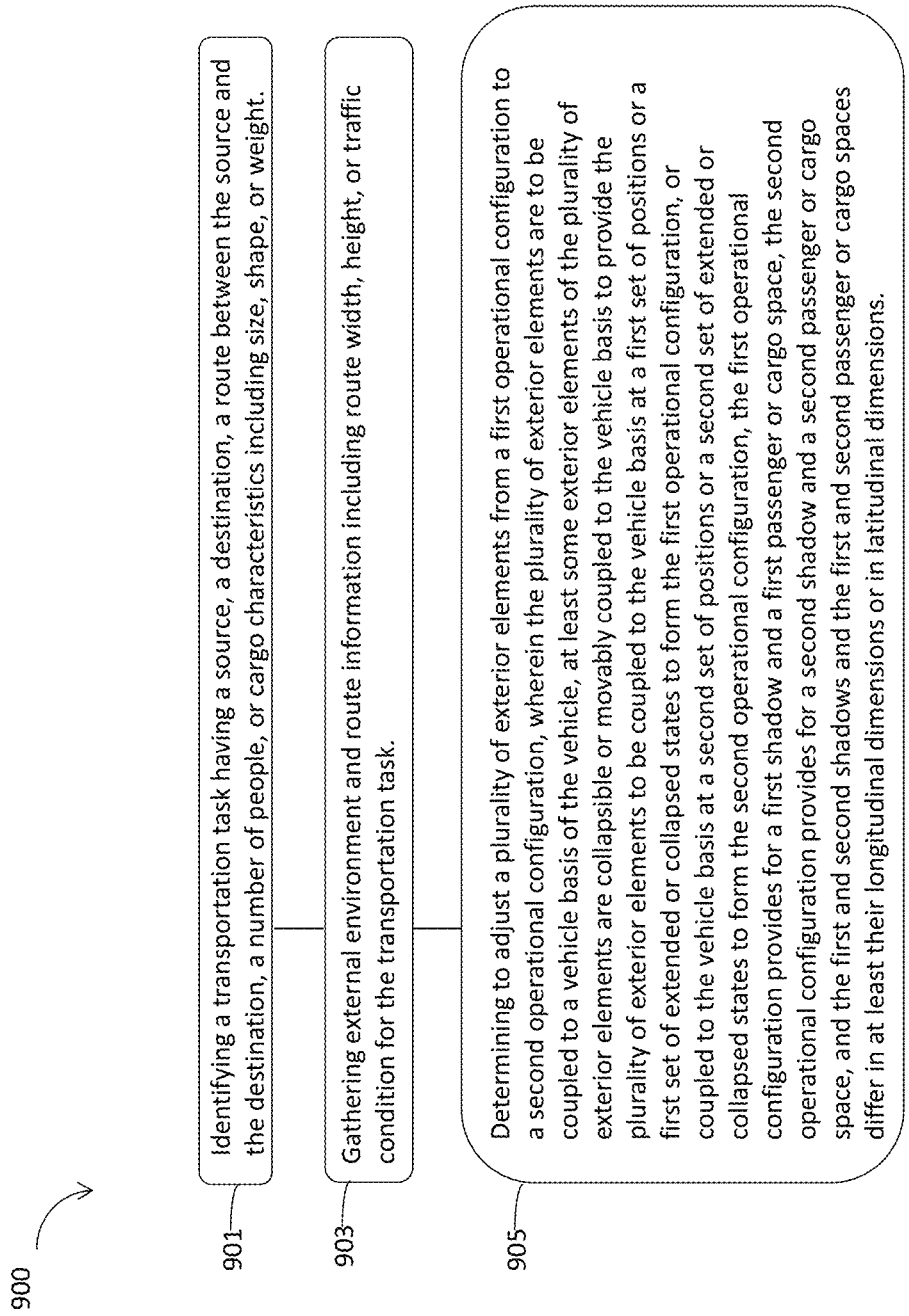
FIG. 9 illustrates an example process for a vehicle for variably sized transportation, in accordance with various embodiments.

FIG. 9 illustrates an example process 900 for a vehicle for variably sized transportation, in accordance with various embodiments. In embodiments, the process 900 may be a process performed by the vehicle 100 in FIG. 1, the vehicle 200 in FIG. 2, the vehicle 600 in FIG. 6, or other vehicles presented in the current disclosure.

The process 900 may start at an interaction 901. During the interaction 901, a transportation task may be identified, where the transportation task may have a source, a destination, a route between the source and the destination, a number of people, or cargo characteristics including size, shape, or weight. For example, at the interaction 901, the vehicle 200, or more specifically, the adjustment controller 213, may identify a transportation task having a source, a destination, a route between the source and the destination, a number of people, or cargo characteristics including size, shape, or weight. Such transportation task information may be gathered by a driver or a user of the vehicle 200.

During an interaction 903, external environment and route information including route width, height, or traffic condition for the transportation task, may be gathered. For example, at the interaction 903, the vehicle 200, or more specifically, the adjustment controller 213, may gather external environment and route information including route width, height, or traffic condition for the transportation task. Such external environment and route information may be gathered from the user, the driver, or other databased stored in the vehicle 200, or in other places such as in the cloud.

During an interaction 905, a plurality of exterior elements may be adjusted to change the vehicle from a first operational configuration to a second operational configuration. In embodiments, the plurality of exterior elements may be coupled to a vehicle basis of the vehicle. At least some exterior elements of the plurality of exterior elements may be collapsible or movably coupled to the vehicle basis to provide the plurality of exterior elements to be coupled to the vehicle basis at a first set of positions or a first set of extended or collapsed states to form the first operational configuration, or coupled to the vehicle basis at a second set of positions or a second set of extended or collapsed states to form the second operational configuration. The first operational configuration may provide for a first shadow and a first passenger or cargo space, while the second operational configuration may provide for a second shadow and a second passenger or cargo space. The first and second shadows and the first and second passenger or cargo spaces differ in at least their longitudinal dimensions or in latitudinal dimensions. For example, at the interaction 905, the vehicle 200, or more specifically, the adjustment controller 213, may determine to adjust a plurality of exterior elements from a first operational configuration to a second operational configuration. As another example, at the interaction 905, the vehicle 300 may determine to adjust the exterior element 302 and the exterior element 304 from a first operational configuration shown in FIG. 3(a) to a second operational configuration shown in FIG. 3(b).

Figure 10:
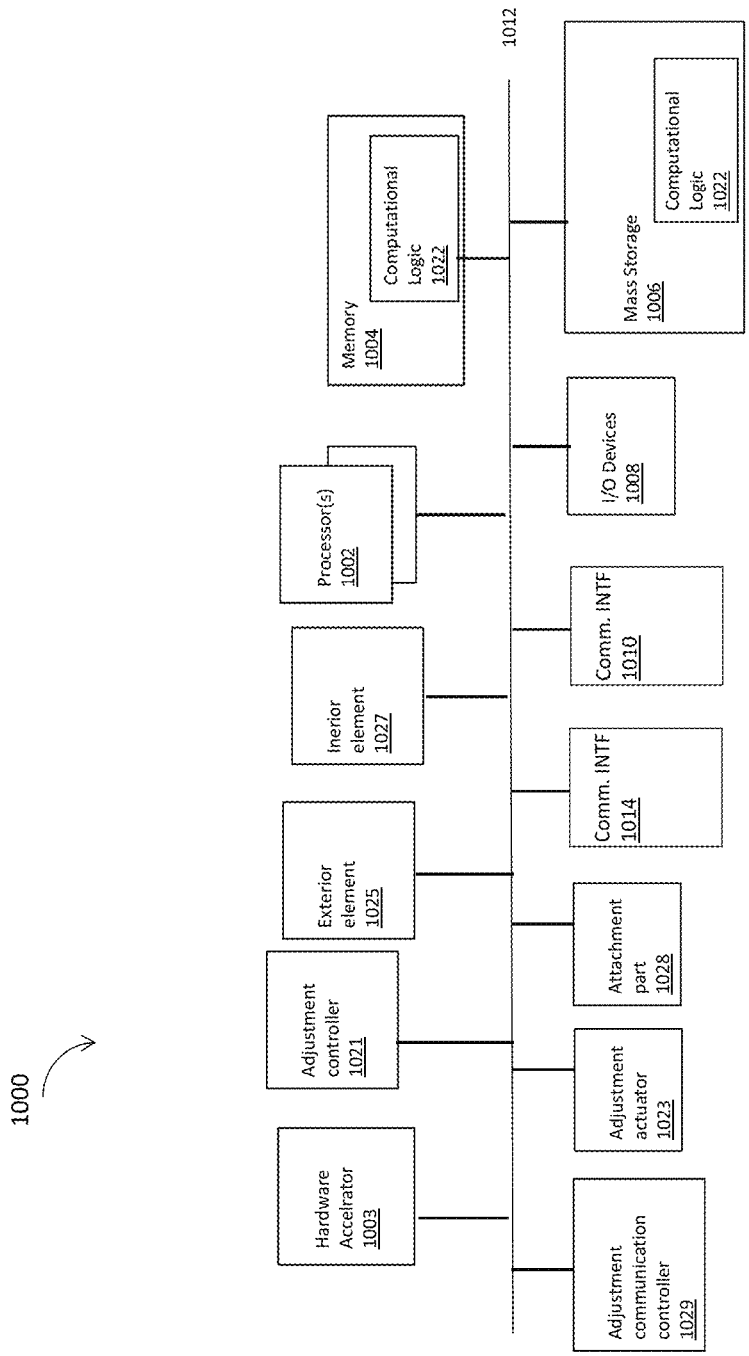
FIG. 10 illustrates an example device suitable for use to practice various aspects of the present disclosure, in accordance with various embodiments.

FIG. 10 illustrates an example device 1000 that may be suitable as a device to practice selected aspects of the present disclosure. The device 1000 may be an example of the vehicle 100, the vehicle 200, the vehicle 300, the vehicle 400, the vehicle 500, the vehicle 600, the vehicle 700, the vehicle 801, the vehicle 803, the vehicle 805, the vehicle 807, or any other vehicles as shown in the current disclosure. As shown, the device 1000 may include one or more processors 1002, each having one or more processor cores, or and optionally, a hardware accelerator 1003 (which may be an ASIC or a FPGA). In alternate embodiments, the hardware accelerator 1003 may be part of processor 1002, or integrated together on a SOC. Additionally, the device 1000 may include a memory 1004, which may be any one of a number of known persistent storage medium, and mass storage 1006. In addition, the 1000 may include input/output devices 1008. Furthermore, the device 1000 may include communication interfaces 1010 and 1014. Communication interfaces 1010 and 1014 may be any one of a number of known communication interfaces. The elements may be coupled to each other via system bus 1012, which may represent one or more buses. In the case of multiple buses, they may be bridged by one or more bus bridges (not shown). In addition, the device 1000 may include an adjustment controller 1021, an adjustment communication controller 1029, an adjustment actuator 1023, an exterior element 1025, an interior element 1027, and an attachment part 1028, which may be an example of the adjustment controller 613, the adjustment communication controller 617, the adjustment actuator 615, the exterior elements 602, the interior elements 604, and the attachment part 606 as shown in FIG. 6.

Each of these elements may perform its conventional functions known in the art. In particular, memory 1004 may include instructions, in response to execution by processor 102 to control the adjustment controller 1021, the adjustment communication controller 1029, and the adjustment actuator 1023, to perform adjustment of the exterior element 1025, and the interior element 1027 to provide variably sized transportation, as described in connection with FIGS. 1-9, collectively referred to as computational logic 1022 that provides the capability of the embodiments described in the current disclosure. The computational logic 1022 may be implemented by assembler instructions supported by processor(s) 1002 or high-level languages, such as, for example, C, that can be compiled into such instructions. Operations associated with variably sized transportation not implemented in software may be implemented in hardware, e.g., via hardware accelerator 1003.

The number, capability and/or capacity of these elements 1001-1029 may vary, depending on the number of other devices the device 1000 is configured to support. Otherwise, the constitutions of elements 1001-1029 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 11:
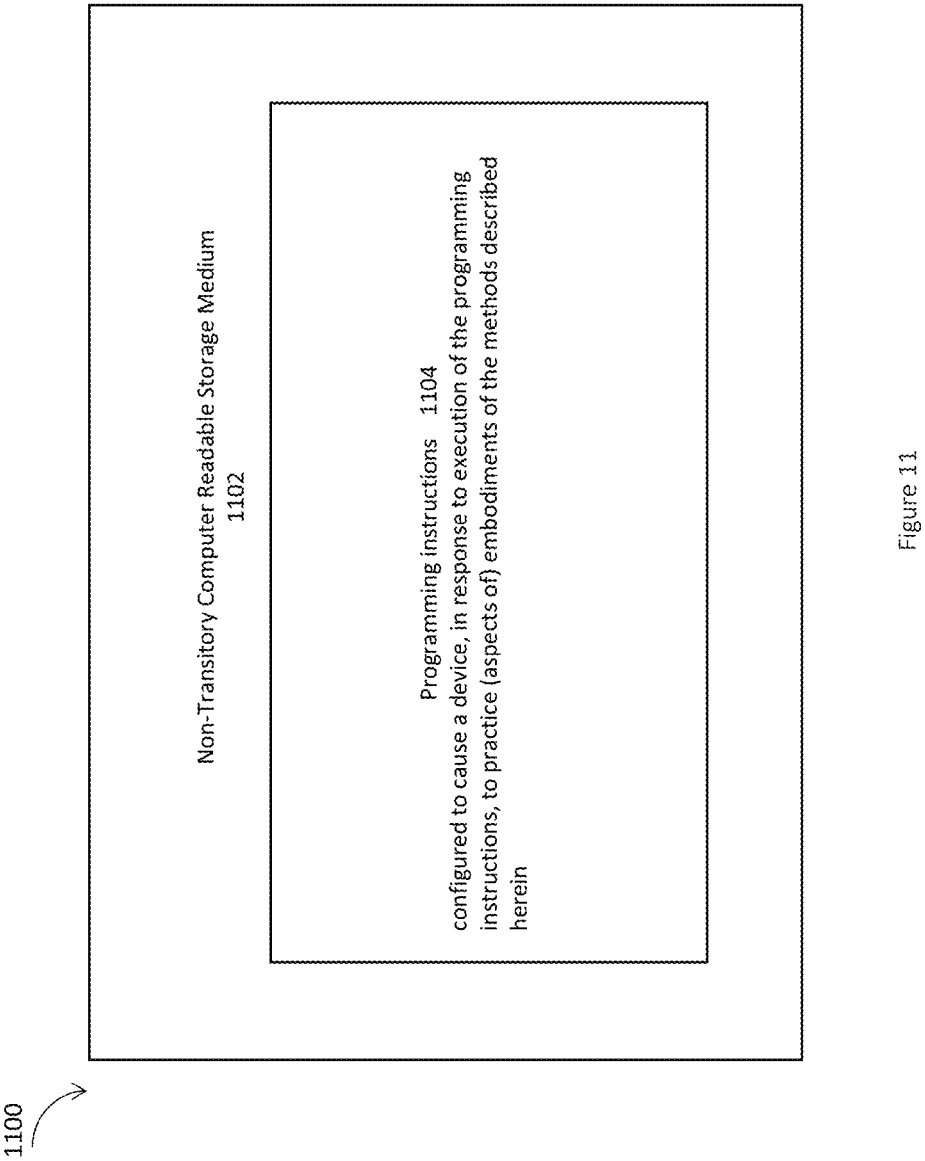
FIG. 11 illustrates a storage medium having instructions for practicing methods described with references to FIGS. 1-10, in accordance with various embodiments.

Furthermore, the present disclosure may take the form of a computer program product embodied in any tangible or non-transitory medium of expression having computer-usable program code embodied in the medium. FIG. 11 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a device, e.g., device 1000, in response to execution of the programming instructions in a vehicle for variably sized transportation, to perform, e.g., various operations associated with the vehicle 100, the vehicle 200, the vehicle 600, as shown in FIG. 1, FIG. 2, and FIG. 6, or any other vehicles shown in the current disclosure.

In alternate embodiments, programming instructions 1104 may be disposed on multiple computer-readable non-transitory storage media 1102 instead. In alternate embodiments, programming instructions 1104 may be disposed on computer-readable transitory storage media 1102, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

FIG. 12 illustrates an environment 1200 in which various embodiments described with references to FIGS. 1-11 may be practiced. Environment 1200 includes a vehicle 1201, a wireless access node 1203, and a cloud computing service 1205 (also referred to as "cloud 1205", "the cloud 1205", and the like). The vehicle 1201 may be an ADV having a VECD 1211, which may be a vehicle for variably sized transportation, as illustrated in FIGS. 1-11. For illustrative purposes, the following description is provided deployment scenarios including the vehicle 1201 in a two dimensional (2D) freeway/highway/roadway environment. However, the embodiments described herein are also applicable to any type of vehicle, such as trucks, buses, motorcycles, boats or motorboats, and/or any other motorized devices for variably sized transportation, as illustrated in FIGS. 1-11.

The vehicle 1201 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 12 shows only a single vehicle 1201, the vehicle 1201 may represent a plurality of individual motor vehicles of varying makes, models, trim, etc., which may be collectively referred to herein as the "vehicle 1201."

In embodiments, the vehicle 1201, as alluded to earlier, may include the VECD 1211. The VECD 1211 may be any type of computer device that is mounted on, built into, or otherwise embedded in a vehicle and is capable of performing operations for variably sized transportation, as illustrated in FIGS. 1-11. In some embodiments, the VECD 1211 may be a computer device used to control one or more systems of the vehicle 1201, such as an ECU, ECM, embedded system, microcontroller, control module, EMS, OBD devices, DME, MDTs, etc.

The VECD 1211 may include one or more processors) having one or more processor cores and optionally, one or more hardware accelerators), memory devices, communication devices, etc. that may be configured to carry out various functions according to the various embodiments discussed here. For example, the VECD 1211 may execute instructions stored in a computer-readable medium, e.g., the computer-readable medium 1102 as shown in FIG. 11, or may be pre-configured with the logic (e.g., with appropriate bit streams, logic blocks, etc.), to perform functions for variably sized transportation, as illustrated in FIGS. 1-11.

The data obtained by the VECD 1211 may include sensor data from one or more sensors embedded in the vehicle 1201, data packets from other VECD 1211s included in other vehicles 1201 (not shown), data packets and/or data streams from cloud 1205 and/or network infrastructure (e.g., core network elements of a cellular communications network, etc.), navigation signaling/data from on-board navigations systems (e.g., global navigation satellite system (GNSS), global positioning system (GPS), etc.), and/or the like. In embodiments, the VECD 1211 may also include, or operate in conjunction with communications circuitry and/or input/output) I/O (interface circuitry in order to obtain the data for the various sources.

The communications circuitry of the vehicle 1201 may communicate with the cloud 1205 via the wireless access node 1203. The wireless access node 1203 may be one or more hardware computer devices configured to provide wireless communication services to mobile devices (for example, VECD 1211 in vehicle 1201 or some other suitable device) within a coverage area or cell associated with the wireless access node 1203. The wireless access node 1203 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 1207). Furthermore, one or more network interface controllers may be configured to transmit/receive with various network elements (e.g., one or more servers within a core network, etc.) over another backhaul connection (not shown). In embodiments, the VECD 1211 may generate and transmit data to the wireless access node 1203 over link 1207, and the wireless access node 1203 may provide the data to the cloud 1205 over backhaul link 1209. Additionally, during operation of the vehicle 1201, the wireless access node 1203 may obtain data intended for the VECD 1211 from the cloud 1205 over link 1209, and may provide that data to the VECD 1211 over link 1207. The communications circuitry in the vehicle 1201 may communicate with the wireless access node 1203 in accordance with one or more wireless communications protocols as discussed herein.

As an example, the wireless access node 1203 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 1203 may be deployed outdoors to provide communications for the vehicle 1201 when the vehicle 1201 is operating at large, for example when deployed on public roads, streets, highways, etc.

In some embodiments, the wireless access node 1203 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 1203 is a GW, the wireless access node 1203 may be deployed in an indoor setting, such as a garage, factory, laboratory or testing facility, and may be used to provide communications for while parked, prior to sale on the open market, or otherwise not operating at large.

In embodiments, the cloud 1205 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 1205 may be associated with network operator who owns or controls equipment and other elements necessary to provide network-related services, such as one or more base stations or access points (e.g., wireless access node 1203), one or more servers for routing digital data or telephone calls (for example, a core network or backbone network), etc. Implementations, components, and protocols used to communicate via such services may be those known in the art and are omitted herein for the sake of brevity.

In some embodiments, the cloud 1205 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 1205 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 1205 and database systems) may coordinate the delivery of data to the VECD 1211 of vehicle 1201. Implementations, components, and protocols used to communicate via such services may be those known in the art and are omitted herein for the sake of brevity.

Thus various example embodiments of the present disclosure have been described including, but are not limited to:

Example 1 may include a vehicle for variably sized transportation, comprising: a vehicle basis; and a plurality of exterior elements coupled to the vehicle basis; wherein at least some exterior elements are collapsible or movably coupled to the vehicle basis to provide the plurality of exterior elements to be coupled to the vehicle basis at a first set of positions or a first set of extended or collapsed states to form a first operational configuration, or coupled to the vehicle basis at a second set of positions or a second set of extended or collapsed states to form a second operational configuration; wherein the first operational configuration provides for a first shadow and a first passenger or cargo space, and the second operational configuration provides for a second shadow and a second passenger or cargo space; wherein the first and second shadows and the first and second passenger or cargo spaces differ in at least their longitudinal dimensions or in latitudinal dimensions; and wherein the vehicle basis comprises an adjustment actuator, the adjustment actuator is to facilitate positioning of the plurality of exterior elements from the first operational configuration to the second operational configuration.

Example 2 may include the vehicle of example 1 and/or some other examples herein, wherein the vehicle in the first operational configuration and the second operational configuration, or the first and second passenger or cargo spaces further differ in their heights.

Example 3 may include the vehicle of example 1 and/or some other examples herein, wherein the vehicle basis together with the plurality of exterior elements in the first operational configuration has a first length relative to a surface of a road and a first width relative to the surface of the road, the vehicle basis together with the plurality of exterior elements in the second operational configuration has a second length relative to the surface of the road and a second width relative to the surface of the road, the first length is larger than the second length, or the first width is larger than the second width.

Example 4 may include the vehicle of any one of examples 1-3 and/or some other examples herein, wherein the plurality of exterior elements include one or more of a part of a frame or a body of the vehicle, a wheel, a mirror, a door, a rim, a valance, or a fender.

Example 5 may include the vehicle of any one of examples 1-3 and/or some other examples herein, wherein an exterior element of the plurality of exterior elements is of a circular shape, an elliptical shape, a rectangle shape, or a polygon shape.

Example 6 may include the vehicle of any one of examples 1-3 and/or some other examples herein, wherein the vehicle basis further includes a vehicle main computer, or an adjustment controller coupled to the adjustment actuator to determine to move at least some of the plurality of exterior elements, or to collapse or extend at least some of the plurality of exterior elements to change the vehicle from the first operational configuration to the second operational configuration.

Example 7 may include the vehicle of any one of examples 1-3 and/or some other examples herein, wherein the vehicle basis together with the plurality of exterior elements in the first operational configuration is for no human or no cargo within the vehicle.

Example 8 may include the vehicle of any one of examples 1-3 and/or some other examples herein, further comprising: a plurality of interior elements collapsible or movably coupled to the vehicle basis, wherein the plurality of interior elements are to be coupled to the vehicle basis at a first set of internal positions or a first set of extended or collapsed internal states to form a first internal operational configuration, or coupled to the vehicle basis at a second set of internal positions or a second set of extended or collapsed internal states to form a second internal operational configuration.

Example 9 may include the vehicle of example 8 and/or some other examples herein, wherein the plurality of interior elements include one or more of an engine, a fuel system, an electrical system, a cooling and lubrication system, an exhaust and emission control system, a drive train system, a suspension, a steering wheel, a brake system, or an accessory and safety system.

Example 10 may include the vehicle of example 8 and/or some other examples herein, wherein the plurality of interior elements include an engine with a telescopic movable pipe.

Example 11 may include the vehicle of any one of examples 1-3 and/or some other examples herein, wherein the vehicle is a first vehicle, and the first vehicle further includes an attachment part attached to the vehicle basis, and the first vehicle is to be combined with a second vehicle through the attachment part.

Example 12 may include the vehicle of example 11 and/or some other examples herein, wherein the vehicle basis further comprises an adjustment communication controller coupled to the adjustment actuator, wherein the adjustment communication controller is to communicate with the second vehicle to combine the first vehicle and the second vehicle through the attachment part.

Example 13 may include the vehicle of example 11 and/or some other examples herein, wherein the second vehicle is to be combined with the first vehicle in parallel relative to a surface of a road to obtain a combined vehicle, wherein the combined vehicle has a shadow size that fits into a driving lane of the road.

Example 14 may include the vehicle of example 11 and/or some other examples herein, wherein the second vehicle is to be combined with the first vehicle in sequence relative to a surface of a road to obtain a combined vehicle, wherein the combined vehicle has a shadow size that fits into a driving lane of the road.

Example 15 may include a method for a vehicle for variably sized transportation, comprising: identifying a transportation task having a source, a destination, a route between the source and the destination, a number of people, or cargo characteristics including size, shape, or weight; gathering external environment and route information including route width, height, or traffic condition for the transportation task; determining to adjust a plurality of exterior elements from a first operational configuration to a second operational configuration, wherein the plurality of exterior elements are to be coupled to a vehicle basis of the vehicle, at least some exterior elements of the plurality of exterior elements are collapsible or movably coupled to the vehicle basis to provide the plurality of exterior elements to be coupled to the vehicle basis at a first set of positions or a first set of extended or collapsed states to form the first operational configuration, or coupled to the vehicle basis at a second set of positions or a second set of extended or collapsed states to form the second operational configuration, the first operational configuration provides for a first shadow and a first passenger or cargo space, the second operational configuration provides for a second shadow and a second passenger or cargo space, and the first and second shadows and the first and second passenger or cargo spaces differ in at least their longitudinal dimensions or in latitudinal dimensions.

Example 16 may include the method of example 15 and/or some other examples herein, wherein the vehicle basis together with the plurality of exterior elements in the first operational configuration has a first length relative to a surface of a road and a first width relative to the surface of the road, the vehicle basis together with the plurality of exterior elements in the second operational configuration has a second length relative to the surface of the road and a second width relative to the surface of the road, the first length is larger than the second length, or the first width is larger than the second width.

Example 17 may include the method of example 15 and/or some other examples herein, wherein the plurality of exterior elements include one or more of a part of a frame or a body of the vehicle, a wheel, a mirror, a door, a rim, a valance, or a fender.

Example 18 may include the method of example 15 and/or some other examples herein, wherein an exterior element of the plurality of exterior elements is of a circular shape, an elliptical shape, a rectangle shape, or a polygon shape.

Example 19 may include the method of any one of examples 15-18 and/or some other examples herein, further comprising: determining to adjust a plurality of interior elements from a first internal operational configuration to a second internal operational configuration, wherein the plurality of interior elements are collapsible or movably coupled to the vehicle basis, the plurality of interior elements are to be coupled to the vehicle basis at a first set of internal positions or a first set of extended or collapsed internal states to form the first internal operational configuration, or coupled to the vehicle basis at a second set of internal positions or a second set of extended or collapsed internal states to form the second internal operational configuration; and wherein the plurality of interior elements include one or more of an engine, a fuel system, an electrical system, a cooling and lubrication system, an exhaust and emission control system, a drive train system, a suspension, a steering wheel, a brake system, or an accessory and safety system.

Example 20 may include the method of any one of examples 15-18 and/or some other examples herein, further comprising: determining to combine the vehicle with a second vehicle through an attachment part attached to the vehicle basis.

Example 21 may include a vehicle for variably sized transportation, comprising: a vehicle basis; a plurality of exterior elements coupled to the vehicle basis; wherein at least some exterior elements are collapsible or movably coupled to the vehicle basis to provide the plurality of exterior elements to be coupled to the vehicle basis at a first set of positions or a first set of extended or collapsed states to form a first operational configuration, or coupled to the vehicle basis at a second set of positions or a second set of extended or collapsed states to form a second operational configuration; wherein the first operational configuration provides for a first shadow and a first passenger or cargo space, and the second operational configuration provides for a second shadow and a second passenger or cargo space; wherein the first and second shadows and the first and second passenger or cargo spaces differ in at least their longitudinal dimensions or in latitudinal dimensions; a plurality of interior elements collapsible or movably coupled to the vehicle basis, wherein the plurality of interior elements are to be coupled to the vehicle basis at a first set of internal positions or a first set of extended or collapsed internal states to form a first internal operational configuration, or coupled to the vehicle basis at a second set of internal positions or a second set of extended or collapsed internal states to form a second internal operational configuration different from the first internal operational configuration, and wherein the vehicle basis comprises an adjustment actuator, the adjustment actuator is to facilitate positioning of the plurality of exterior elements from the first operational configuration to the second operational configuration, or positioning of the plurality of interior elements from the first internal operational configuration to the second internal operational configuration.

Example 22 may include the vehicle of example 21 and/or some other examples herein, wherein the vehicle basis together with the plurality of exterior elements in the first operational configuration has a first length relative to a surface of a road and a first width relative to the surface of the road, the vehicle basis together with the plurality of exterior elements in the second operational configuration has a second length relative to the surface of the road and a second width relative to the surface of the road, the first length is larger than the second length, or the first width is larger than the second width.

Example 23 may include the vehicle of any one of examples 21-22 and/or some other examples herein, wherein the plurality of exterior elements include one or more of a part of a frame or a body of the vehicle, a wheel, a mirror, a door, a rim, a valance, or a fender.

Example 24 may include the vehicle of any one of examples 21-22 and/or some other examples herein, wherein an exterior element of the plurality of exterior elements is of a circular shape, an elliptical shape, a rectangle shape, or a polygon shape.

Example 25 may include the vehicle of any one of examples 21-22 and/or some other examples herein, wherein the plurality of interior elements include one or more of an engine, a fuel system, an electrical system, a cooling and lubrication system, an exhaust and emission control system, a drive train system, a suspension, a steering wheel, a brake system, or an accessory and safety system.

Example 26 may include one or more computer-readable media having instructions for a vehicle for variably sized transportation, upon execution of the instructions by one or more processors, to perform the method of any one of examples 15-20.

Example 27 may include an apparatus for a vehicle for variably sized transportation, comprising: means for identifying a transportation task having a source, a destination, a route between the source and the destination, a number of people, or cargo characteristics including size, shape, or weight; means for gathering external environment and route information including route width, height, or traffic condition for the transportation task; means for determining to adjust a plurality of exterior elements from a first operational configuration to a second operational configuration, wherein the plurality of exterior elements are to be coupled to a vehicle basis of the vehicle, at least some exterior elements of the plurality of exterior elements are collapsible or movably coupled to the vehicle basis to provide the plurality of exterior elements to be coupled to the vehicle basis at a first set of positions or a first set of extended or collapsed states to form the first operational configuration, or coupled to the vehicle basis at a second set of positions or a second set of extended or collapsed states to form the second operational configuration, the first operational configuration provides for a first shadow and a first passenger or cargo space, the second operational configuration provides for a second shadow and a second passenger or cargo space, and the first and second shadows and the first and second passenger or cargo spaces differ in at least their longitudinal dimensions or in latitudinal dimensions.

Example 28 may include the apparatus of example 27 and/or some other examples herein, wherein the vehicle basis together with the plurality of exterior elements in the first operational configuration has a first length relative to a surface of a road and a first width relative to the surface of the road, the vehicle basis together with the plurality of exterior elements in the second operational configuration has a second length relative to the surface of the road and a second width relative to the surface of the road, the first length is larger than the second length, or the first width is larger than the second width.

Example 29 may include the apparatus of example 27 and/or some other examples herein, wherein the plurality of exterior elements include one or more of a part of a frame or a body of the vehicle, a wheel, a mirror, a door, a rim, a valance, or a fender.

Example 30 may include the apparatus of example 27 and/or some other examples herein, wherein an exterior element of the plurality of exterior elements is of a circular shape, an elliptical shape, a rectangle shape, or a polygon shape.

Example 31 may include the apparatus of any one of examples 27-30 and/or some other examples herein, further comprising: means for determining to adjust a plurality of interior elements from a first internal operational configuration to a second internal operational configuration, wherein the plurality of interior elements are collapsible or movably coupled to the vehicle basis, the plurality of interior elements are to be coupled to the vehicle basis at a first set of internal positions or a first set of extended or collapsed internal states to form the first internal operational configuration, or coupled to the vehicle basis at a second set of internal positions or a second set of extended or collapsed internal states to form the second internal operational configuration; and wherein the plurality of interior elements include one or more of an engine, a fuel system, an electrical system, a cooling and lubrication system, an exhaust and emission control system, a drive train system, a suspension, a steering wheel, a brake system, or an accessory and safety system.

Example 32 may include the apparatus of any one of examples 27-30 and/or some other examples herein, further comprising: means for determining to combine the vehicle with a second vehicle through an attachment part attached to the vehicle basis.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A vehicle for variably sized transportation, comprising:
   a vehicle basis; and
   a plurality of exterior elements and a plurality of interior elements coupled to the vehicle basis;
   wherein at least some exterior or interior elements are collapsible or movably coupled to the vehicle basis to provide the plurality of exterior or interior elements to be coupled to the vehicle basis at a first set of positions or a first set of extended or collapsed states to form a first operational configuration, and coupled to the vehicle basis at a second set of positions or a second set of extended or collapsed states to form a second operational configuration;
   wherein the first operational configuration provides for a first shadow and a first passenger or cargo space for a first number of passengers or cargos, the second operational configuration provides for a second shadow and a second passenger or cargo space for a second number of passengers or cargos larger than the first number of passengers or cargos, the first shadow is determined by a first exterior longitudinal dimension and a first exterior latitudinal dimension of the first operational configuration, the second shadow is determined by a second exterior longitudinal dimension and a second exterior latitudinal dimension of the second operational configuration;
   wherein the second shadow and the second passenger or cargo space have at least a longitudinal dimension or a latitudinal dimension respectively larger than a longitudinal dimension or a latitudinal dimension of the first shadow and the first passenger or cargo space; and
   wherein the vehicle basis comprises an adjustment actuator, the adjustment actuator is to facilitate reconfiguring or repositioning of at least some of the plurality of exterior or interior elements from the first operational configuration to the second operational configuration; and wherein the at least some of the plurality of exterior or interior elements reconfigured or repositioned from the first operational configuration to the second operational configuration include one or more of an engine, a fuel system, a cooling and lubrication system, an exhaust and emission control system, a drive train system, a suspension, a steering wheel, or a brake system.

2. The vehicle of claim 1, wherein the second shadow and the second passenger or cargo space further has a highest point higher than a highest point of the first shadow and the first passenger or cargo space.

3. The vehicle of claim 1, wherein the vehicle basis together with the plurality of exterior elements in the first operational configuration has a first length, and the vehicle basis together with the plurality of exterior elements in the second operational configuration has a second length, wherein the first length is longer than the second length.

4. The vehicle of claim 1, wherein the plurality of exterior elements include one or more of a part of a frame or a body of the vehicle, a wheel, a mirror, a door, a rim, a valance, or a fender.

5. The vehicle of claim 1, wherein an exterior element of the plurality of exterior elements is of a circular shape, an elliptical shape, a rectangle shape, or a polygon shape.

6. The vehicle of claim 1, wherein the vehicle basis further includes a vehicle main computer, or an adjustment controller coupled to the adjustment actuator to determine to move at least some of the plurality of exterior or interior elements, or to collapse or extend at least some of the plurality of exterior or interior elements to change the vehicle from the first operational configuration to the second operational configuration.

7. The vehicle of claim 1, wherein the vehicle basis together with the plurality of exterior elements in the first operational configuration is for no human or no cargo within the vehicle.

8. The vehicle of claim 1, wherein the vehicle is a first variably sized vehicle, and the first variable sized vehicle further includes an attachment part attached to the vehicle basis of the first variable sized vehicle, to combine with a second variable sized vehicle through the attachment part, while the first variable sized vehicle is in the first operational configuration with the first shadow, and the second variable sized vehicle is in one of at least two configurations that provides for a smaller of at least two shadows.

9. The vehicle of claim 8, wherein the vehicle basis further comprises an adjustment communication controller coupled to the adjustment actuator, wherein the adjustment communication controller is to communicate with the second variably sized vehicle to combine the first variably sized vehicle and the second variably sized vehicle through the attachment part.

10. The vehicle of claim 8, wherein the second variably sized vehicle is to be combined with the first variably sized vehicle in parallel relative to a surface of a road to obtain a combined vehicle, wherein the combined vehicle has a shadow size that fits into a driving lane of the road.

11. The vehicle of claim 8, wherein the second variably sized vehicle is to be combined with the first variably sized vehicle in sequence relative to a surface of a road to obtain a combined vehicle, wherein the combined vehicle has a shadow size that fits into a driving lane of the road.

12. A method for a vehicle for variably sized transportation, comprising:
identifying a transportation task having a source, a destination, a route between the source and the destination, and a number of people;
gathering external environment and route information including route width, height, or traffic condition for the transportation task;
adjusting a plurality of exterior and interior elements coupled to a vehicle basis of the vehicle from a first operational configuration to a second operational configuration, wherein the plurality of exterior and interior elements are to be coupled to the vehicle basis of the vehicle, at least some exterior and interior elements of the plurality of exterior and interior elements are collapsible or movably coupled to the vehicle basis to provide the plurality of exterior and interior elements to be coupled to the vehicle basis at a first set of positions or a first set of extended or collapsed states to form the first operational configuration, and coupled to the vehicle basis at a second set of positions or a second set of extended or collapsed states to form the second operational configuration, the first operational configuration provides for a first shadow and a first passenger or cargo space for a first number of passengers or cargos, the second operational configuration provides for a second shadow and a second passenger or cargo space for a second number of passengers or cargos larger than the first number of passengers or cargos, and the second shadow and the second passenger or cargo space have at least a longitudinal dimension or a latitudinal dimension respectively larger than a longitudinal dimension or a latitudinal dimension of the first shadow and the first passenger or cargo space, wherein the first shadow is determined by a first exterior longitudinal dimension and a first exterior latitudinal dimension of the first operational configuration, the second shadow is determined by a second exterior longitudinal dimension and a second exterior latitudinal dimension of the second operational configuration, wherein the vehicle basis comprises an adjustment actuator, the adjustment actuator is to facilitate reconfiguring or repositioning at least some of the exterior and interior elements from the first operational configuration to the second operational configuration, and wherein the at least some of the plurality of exterior and interior elements reconfigured or repositioned from the first operational configuration to the second operational configuration include one or more of an engine, a fuel system, a cooling and lubrication system, an exhaust and emission control system, a drive train system, a suspension, a steering wheel, or a brake system.

13. The method of claim 12, wherein the vehicle basis together with the plurality of exterior elements in the first operational configuration has a first length, the vehicle basis together with the plurality of exterior elements in the second operational configuration has a second length, the first length is larger than the second length, or the first width is larger than the second width.

14. The method of claim 12, wherein the plurality of exterior elements include one or more of a part of a frame or a body of the vehicle, a wheel, a mirror, a door, a rim, a valance, or a fender.

15. The method of claim 12, wherein the vehicle is a first variably sized vehicle, and the method further comprising:
combining the first variably sized vehicle with a second variably sized vehicle through an attachment part attached to the vehicle basis.

16. The method of claim 15, wherein the combining of the first variably sized vehicle with the second variably sized vehicle through an attachment part attached to the vehicle basis comprises combining the first variably sized vehicle with the second variably sized vehicle in parallel relative to a surface of a road to obtain a combined vehicle, wherein the combined vehicle has a shadow size that fits into a driving lane of the road.

17. The method of claim 15, wherein the combining of the first variably sized vehicle with the second variably sized vehicle through an attachment part attached to the vehicle basis comprises combining the first variably sized vehicle with the second variably sized vehicle in sequence relative to a surface of a road to obtain a combined vehicle, wherein the combined vehicle has a shadow size that fits into a driving lane of the road.

18. A vehicle for variably sized transportation, comprising:
a vehicle basis;
a plurality of exterior elements and a plurality of interior elements coupled to the vehicle basis;
wherein at least some of the exterior and interior elements are collapsible or movably coupled to the vehicle basis to provide the plurality of exterior and interior elements to be coupled to the vehicle basis at a first set of positions or a first set of extended or collapsed states to form a first operational configuration, and coupled to the vehicle basis at a second set of positions or a second set of extended or collapsed states to form a second operational configuration;
wherein the first operational configuration provides for a first shadow and a first passenger or cargo space, and the second operational configuration provides for a second shadow and a second passenger or cargo space, wherein the first shadow is determined by a first exterior longitudinal dimension and a first exterior latitudinal dimension of the first operational configuration, the second shadow is determined by a second exterior longitudinal dimension and a second exterior latitudinal dimension of the second operational configuration;

wherein the first and second shadows and the first and second passenger or cargo spaces differ in at least one of the longitudinal or latitudinal dimensions;

wherein the vehicle basis comprises an adjustment actuator, the adjustment actuator is to facilitate reconfiguring or repositioning of at least some of the plurality of exterior and interior elements from the first operational configuration to the second operational configuration;

wherein the vehicle is a first variably sized vehicle, and the first variable sized vehicle further includes an attachment part attached to the vehicle basis of the first variable sized vehicle, to combine with a second variable sized vehicle through the attachment part, while the first variable sized vehicle is in the first operational configuration with the first shadow, and the second variable sized vehicle is in one of at least two configurations that provides for a smaller of at least two shadows; and wherein the at least some of the plurality of exterior and interior elements reconfigured or repositioned from the first operational configuration to the second operational configuration include one or more of an engine, a fuel system, a cooling and lubrication system, an exhaust and emission control system, a drive train system, a suspension, a steering wheel, or a brake system.

19. The vehicle of claim 18, wherein the vehicle basis together with the plurality of exterior elements in the first operational configuration has a first length and a first width, the vehicle basis together with the plurality of exterior elements in the second operational configuration has a second length relative to the surface of the road and a second width, the first length is larger than the second length, or the first width is larger than the second width.

20. The vehicle of claim 18, wherein the plurality of exterior elements include one or more of a part of a frame or a body of the vehicle, a wheel, a mirror, a door, a rim, a valance, or a fender.

21. The vehicle of claim 18, wherein an exterior element of the plurality of exterior elements is of a circular shape, an elliptical shape, a rectangle shape, or a polygon shape.

22. The vehicle of claim 18, wherein the vehicle basis further comprises an adjustment communication controller coupled to the adjustment actuator, wherein the adjustment communication controller is to communicate with the second variably sized vehicle to combine the first variably sized vehicle and the second variably sized vehicle through the attachment part.

23. The vehicle of claim 18, wherein the second variably sized vehicle is to be combined with the first variably sized vehicle in parallel relative to a surface of a road to obtain a combined vehicle, wherein the combined vehicle has a shadow size that fits into a driving lane of the road.

24. The vehicle of claim 18, wherein the second variably sized vehicle is to be combined with the first variably sized vehicle in sequence relative to a surface of a road to obtain a combined vehicle, wherein the combined vehicle has a shadow size that fits into a driving lane of the road.

* * * * *